United States Patent
Xue et al.

(10) Patent No.: US 10,841,805 B2
(45) Date of Patent: Nov. 17, 2020

(54) INTER-OPERATOR COORDINATION FOR CHANNEL ACCESS IN SHARED SPECTRUM

(71) Applicant: QUALCOMM Incorporated, San Diego, CA (US)

(72) Inventors: Yisheng Xue, San Diego, CA (US); Siddhartha Mallik, San Diego, CA (US); Weiliang Zeng, San Diego, CA (US); Aleksandar Damnjanovic, Del Mar, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/154,537

(22) Filed: Oct. 8, 2018

(65) Prior Publication Data

US 2019/0110208 A1  Apr. 11, 2019

Related U.S. Application Data

(60) Provisional application No. 62/570,348, filed on Oct. 10, 2017.

(51) Int. Cl.
*H04W 48/12* (2009.01)
*H04W 16/10* (2009.01)
(Continued)

(52) U.S. Cl.
CPC .......... *H04W 16/10* (2013.01); *H04B 17/309* (2015.01); *H04W 16/14* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2009/0191906 A1* | 7/2009 | Abedi | H04W 16/14 455/501 |
| 2015/0036571 A1* | 2/2015 | Taori | H04W 52/0235 370/311 |

(Continued)

FOREIGN PATENT DOCUMENTS

| | | | |
|---|---|---|---|
| EP | 2 523 360 A1 * | 11/2012 | H04B 7/0617 |
| EP | 2523360 A1 | 11/2012 | |

(Continued)

OTHER PUBLICATIONS

International Search Report and Written Opinion—PCT/US2018/055041—ISA/EPO—Jan. 7, 2019.

*Primary Examiner* — Fahmida S Chowdhury
(74) *Attorney, Agent, or Firm* — Liem T. Do

(57) ABSTRACT

Methods, systems, and devices for wireless communications are described. An access point of a secondary cluster may identify a first set of access points of a primary cluster scheduled to perform downlink transmissions over a shared radio frequency spectrum band during a transmission opportunity. The access point may identify a second set of access points and may select a first set of blacklisted stations associated with the secondary cluster for the transmission opportunity. In some cases, the selecting is based on the first set of access points and the second set of access points. The access point may then selectively perform at least one downlink transmission to a second set of stations associated with the secondary cluster during the transmission opportunity. In some examples, the second set of stations is based on the first set of blacklisted stations.

30 Claims, 12 Drawing Sheets

(51) Int. Cl.
*H04W 48/20* (2009.01)
*H04W 48/16* (2009.01)
*H04W 16/14* (2009.01)
*H04W 72/12* (2009.01)
*H04W 48/02* (2009.01)
*H04B 17/309* (2015.01)
*H04W 72/04* (2009.01)
*H04W 92/20* (2009.01)

(52) U.S. Cl.
CPC ........... *H04W 48/02* (2013.01); *H04W 48/12* (2013.01); *H04W 48/16* (2013.01); *H04W 48/20* (2013.01); *H04W 72/1289* (2013.01); *H04W 72/046* (2013.01); *H04W 92/20* (2013.01)

(56) References Cited

U.S. PATENT DOCUMENTS

| | | | |
|---|---|---|---|
| 2015/0146543 A1* | 5/2015 | Diener | H04B 17/318 370/248 |
| 2016/0174078 A1* | 6/2016 | Salem | H04W 28/26 370/329 |
| 2016/0212625 A1 | 7/2016 | Damnjanovic et al. | |
| 2017/0339530 A1* | 11/2017 | Maaref | H04L 5/0033 |

FOREIGN PATENT DOCUMENTS

| | | | |
|---|---|---|---|
| WO | WO-2012156134 A1 * | 11/2012 | ........... H04B 7/0617 |
| WO | WO-2018017686 A1 | 1/2018 | |
| WO | WO-2018190977 A1 | 10/2018 | |

* cited by examiner

INTER-OPERATOR COORDINATION FOR CHANNEL ACCESS IN SHARED SPECTRUM

CROSS REFERENCES

The present Application for Patent claims the benefit of U.S. Provisional Patent Application No. 62/570,348 by XUE, et al., entitled "INTER-OPERATOR COORDINATION FOR CHANNEL ACCESS IN SHARED SPECTRUM," filed Oct. 10, 2017, assigned to the assignee hereof, and expressly incorporated herein.

BACKGROUND

The following relates generally to wireless communications by an access point (AP) of a secondary operator, and more specifically to inter-operator coordination for channel access in shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or APs, each simultaneously supporting communication for multiple communication devices, which may be otherwise known as user equipment (UEs) or stations.

An AP may communicate with a station via downlink and a station may communicate with an AP via uplink. The APs may belong to different operators and may serve different sets of stations. In some cases, the APs belonging to an operator may belong to the same cluster. In some systems, the APs may serve the stations using three-dimensional beamforming and coordinated spatial techniques, such as coordinated multipoint (CoMP) or multi-connectivity. In the technique of CoMP, two or more operators are synchronized with each other according to a global clock, which may be used as a reference for network timing among operators. The operators may alternatively have a priority of transmission during consecutive transmission opportunities.

As the demand for mobile service continues to increase, the possibilities of interference and congested networks grows with APs belonging to different clusters using the same channel to serve their respective stations. There exists a need for inter-operator coordination for channel access to ensure fair access to shared channels and to advance and enhance user experience with mobile communications.

SUMMARY

The described techniques relate to improved methods, systems, devices, and apparatuses that support inter-operator coordination for channel access in a shared radio frequency spectrum band. For example, a shared radio frequency spectrum band may be a band shared by multiple independent operators. The independent operator may be a service provider (e.g., a mobile network operator (MNO)) that uses a shared radio frequency spectrum band. In some cases, the operator may be a cellular operator (e.g., an operator of a public land mobile network (PLMN) or a coordinated set of base stations defining a cellular network, such as an LTE/LTE-A network). In some cases, an operator may be a cluster of access points (APs). In some wireless communications systems, a primary cluster and a secondary cluster may use spatial domain multiplexing to simultaneously access a channel for uplink or downlink transmissions. To reduce interference, the primary cluster may use a broadcast to indicate identification information of each AP of the primary cluster that is scheduled to perform a downlink transmission during an upcoming transmission opportunity. In some cases, the primary cluster may broadcast AP identification during a contention interval. An AP of the secondary cluster may match each of its stations to a corresponding AP of the primary cluster based on a spatial characteristic of that station. The secondary cluster may selectively blacklist one or more of its stations during the upcoming transmission opportunity if the corresponding APs of the primary cluster matched to those stations are in the set of APs indicated in the broadcast by the primary cluster. The secondary cluster may perform downlink transmission to a selected set of stations during the upcoming transmission opportunity that have not been blacklisted for the transmission opportunity. In some cases, the downlink transmission may be performed using spatial division multiplexing or some other interference mitigation technique between the primary cluster and the secondary cluster.

A method of wireless communications by an AP of a secondary cluster is described. The method may include identifying a first set of APs of a primary cluster scheduled to perform downlink transmissions over a shared radio frequency spectrum band during a transmission opportunity, identifying a second set of APs comprising, for each station associated with the secondary cluster, a corresponding AP of the primary cluster selected based on a spatial characteristic of the station, selecting a first set of blacklisted stations associated with the secondary cluster for the transmission opportunity, and selectively performing at least one downlink transmission to a second set of stations associated with the secondary cluster during the transmission opportunity, the second set of stations based on the first set of blacklisted stations, and the at least one downlink transmission using a spatial division multiplexing technique between the primary cluster and the secondary cluster. In some cases, the selecting is based on the first set of APs and the second set of APs.

An apparatus for wireless communications by an AP of a secondary cluster is described. The apparatus may include means for identifying a first set of APs of a primary cluster scheduled to perform downlink transmissions over a shared radio frequency spectrum band during a transmission opportunity, means for identifying a second set of APs comprising, for each station associated with the secondary cluster, a corresponding AP of the primary cluster selected based on a spatial characteristic of the station, means for selecting a first set of blacklisted stations associated with the secondary cluster for the transmission opportunity, and means for selectively performing at least one downlink transmission to a second set of stations associated with the secondary cluster during the transmission opportunity, the second set of stations based on the first set of blacklisted stations, and the at least one downlink transmission using a spatial division multiplexing technique between the primary cluster and the secondary cluster. In some cases, the selecting is based on the first set of APs and the second set of APs.

Another apparatus for wireless communications by an AP of a secondary cluster is described. The apparatus may include a processor, memory in electronic communication with the processor, and instructions stored in the memory. The instructions may be operable to cause the processor to identify a first set of APs of a primary cluster scheduled to perform downlink transmissions over a shared radio frequency spectrum band during a transmission opportunity, identify a second set of APs comprising, for each station associated with the secondary cluster, a corresponding AP of the primary cluster selected based on a spatial characteristic of the station, select a first set of blacklisted stations associated with the secondary cluster for the transmission opportunity, and selectively perform at least one downlink transmission to a second set of stations associated with the secondary cluster during the transmission opportunity, the second set of stations based on the first set of blacklisted stations, the at least one downlink transmission using a spatial division multiplexing technique between the primary cluster and the secondary cluster. In some cases, the selecting is based on the first set of APs and the second set of APs.

A non-transitory computer-readable medium for wireless communication by an AP of a secondary cluster is described. The non-transitory computer-readable medium may include instructions operable to cause a processor to identify a first set of APs of a primary cluster scheduled to perform downlink transmissions over a shared radio frequency spectrum band during a transmission opportunity, identify a second set of APs comprising, for each station associated with the secondary cluster, a corresponding AP of the primary cluster selected based on a spatial characteristic of the station, select a first set of blacklisted stations associated with the secondary cluster for the transmission opportunity, and selectively perform at least one downlink transmission to a second set of stations associated with the secondary cluster during the transmission opportunity, the second set of stations based on the first set of blacklisted stations, the at least one downlink transmission using a spatial division multiplexing technique between the primary cluster and the secondary cluster. In some cases, the selecting is based on the first set of APs and the second set of APs.

Some examples of the method, apparatus, and non-transitory computer-readable medium described above may further include processes, features, means, or instructions for receiving a broadcast message from the primary cluster for the transmission opportunity, the broadcast message comprising identification information of each AP included in the first set of APs.

Some examples of the method, apparatus, and non-transitory computer-readable medium described above may further include processes, features, means, or instructions for determining, for each station associated with the secondary cluster, a path loss to the corresponding AP of the primary cluster. In some cases, the spatial characteristic or parameter of that station comprises the determined path loss.

Some examples of the method, apparatus, and non-transitory computer-readable medium described above may further include processes, features, means, or instructions for receiving a radio resource management (RRM) measurement from at least one station associated with the secondary cluster. Some examples of the method, apparatus, and non-transitory computer-readable medium described above may further include processes, features, means, or instructions for determining the path loss for the at least one station associated with the secondary cluster based on the RRM measurement.

Some examples of the method, apparatus, and non-transitory computer-readable medium described above may further include processes, features, means, or instructions for receiving a spatial signature associated with each AP included in the first set of APs. Some examples of the method, apparatus, and non-transitory computer-readable medium described above may further include processes, features, means, or instructions for determining a spatial signature of each station associated with the secondary cluster based on a path loss between that station and each AP of the primary cluster.

Some examples of the method, apparatus, and non-transitory computer-readable medium described above may further include processes, features, means, or instructions for determining, for each station included in the set of stations associated with the secondary cluster, a correlation between the spatial signature of that station and the spatial signature associated with each AP of the first set of APs. In some cases, selecting the first set of blacklisted stations associated with the secondary cluster for the transmission opportunity may be based on the determined correlation and correlation threshold.

Some examples of the method, apparatus, and non-transitory computer-readable medium described above may further include processes, features, means, or instructions for receiving a spatial signature of each station included in the set of stations associated with the primary cluster.

Some examples of the method, apparatus, and non-transitory computer-readable medium described above may further include processes, features, means, or instructions for determining, for each station included in the set of stations associated with the secondary cluster, a correlation between the spatial signature of that station and the spatial signature for each station included in the set of stations associated with the primary cluster. In some cases, selecting the first set of blacklisted stations associated with the secondary cluster for the transmission opportunity may be based on the determined correlation and correlation threshold.

Some examples of the method, apparatus, and non-transitory computer-readable medium described above may further include processes, features, means, or instructions for receiving from the primary cluster identification information relating to at least one AP associated with the secondary cluster. In some cases, selecting the first set of blacklisted stations associated with the secondary cluster for the transmission opportunity may be based on the received identification.

DETAILED DESCRIPTION

Figure 1:
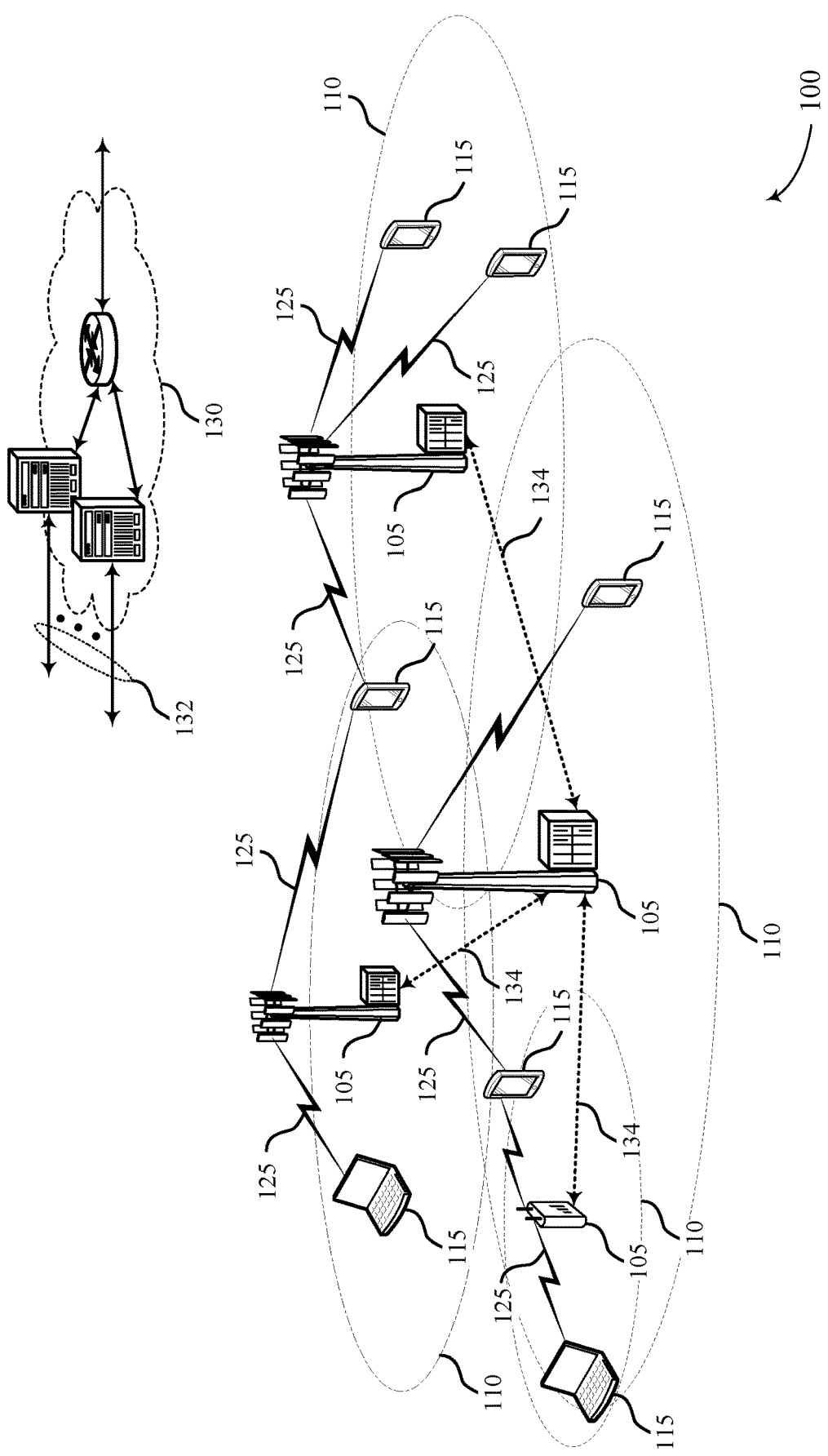
FIG. 1 illustrates an example of a system for wireless communications by an access point (AP) of a secondary operator that supports inter-operator coordination for channel access in shared spectrum in accordance with various aspects of the present disclosure.

Coordinated spatial techniques, such as coordinated multipoint (CoMP) can be useful when a radio frequency spectrum band is shared by multiple independent operators. The independent operator may be a service provider (e.g., a mobile network operator (MNO)) that uses a shared radio frequency spectrum band. In some cases, the operator may be a cellular operator (e.g., an operator of a public land mobile network (PLMN) or a coordinated set of base stations defining a cellular network, such as an LTE/LTE-A network). In some cases, the operator may be a cluster of access points (APs), where each cluster is spatially separated from constituents of other clusters. The cellular operators, also known as a wireless service provider, or wireless carrier, may be a provider of wireless communications services to an end user including radio spectrum allocation, wireless network infrastructure, etc. In CoMP scenarios for a shared radio frequency spectrum band, two operators are synchronized with each other according to a global clock. In some cases, two or more clusters may be synchronized according to the global clock. More specifically, each operator may know a start time of a common contention interval along with details of a primary operator for an upcoming transmission opportunity. In some cases, different operators may switch between being designated as a primary operator or a secondary operator for different transmission opportunities. For example, a first operator may be the primary operator (or a primary cluster) during a first transmission opportunity and a second operator may be the primary operator during the next transmission opportunity. In one example, contention or channel access priority between different operators may be defined using time division multiplexing (TDM). In such systems, there may be no periodic feedback from a receiver to a transmitter for a secondary operator that does not have access to a shared channel. Therefore, even if APs associated with the primary operator do not have enough data to fully occupy the transmission opportunity, APs of the secondary operator with downlink data to transmit may be unable to access the unused resources of the transmission opportunity, which may result in lower throughput and channel efficiency.

In contrast to TDM, Spatial Division Multiplexing (SDM) may allow APs of multiple operators to transmit during the same transmission opportunity. In such systems, a primary operator may have priority to the resources of a shared channel during a transmission opportunity, and a secondary operator may determine a remaining degree of freedom available based on channel monitoring and may selectively schedule transmissions during the same transmission opportunity to occupy the unused spatial resources of the shared channel.

However, the remaining degree of freedom may be accurately estimated using techniques such as perfect transmission beamforming nulling. In some cases, spatially close stations may affect the transmission beamforming nulling. In some cases, spatially close stations may lead to smaller peak nulling gain as well as faster degradation in the presence of channel mismatch. Also, the presence of spatially close stations may impact transmissions to non-spatially-close stations through channel quality indicator (CQI) back-off. Therefore, SDM in CoMP may be used effectively when the transmission beamforming nulling is perfect, when no stations belonging to different operators are located spatially close to each other, or in otherwise interference-limited scenarios.

To address the low efficiency of TDM and problems with imperfect transmission beamforming nulling, the primary operator may broadcast a set of identifications (IDs) for the number of APs of the primary operator that are scheduled to perform downlink transmissions during an upcoming transmission opportunity. Upon receiving the set of IDs, the secondary operator may calculate a path loss for each of its stations to respective APs of the primary operator. The secondary operator may then define a pseudo-serving AP (e.g., the AP of the primary operator to which a station has the smallest path-loss) for each of its stations. The secondary operator may identify each station whose pseudo-serving AP ID belongs to the broadcasted set of IDs. The identified stations may be added to a list of blacklisted stations, where the secondary operator may agree to not schedule downlink transmissions to any station included in the list of blacklisted stations. For example, the secondary operator may not schedule downlink transmission to the stations whose pseudo-serving AP ID is broadcasted by the primary operator.

In some examples, the primary operator may also broadcast a general spatial signature associated with each AP of the primary operator that are scheduled to perform downlink transmissions during an upcoming transmission opportunity. The general spatial signature may be a binary-value signature using the information for all APs associated with the primary operator. The secondary operator may schedule downlink transmission to the stations based on the received spatial signatures.

Aspects of the disclosure are initially described in the context of a wireless communications system that support inter-operator coordination for channel access in shared spectrum wireless communications. Aspects are then described with reference to coordination between a primary operator and a secondary operator in a shared radio frequency spectrum. Aspects of the disclosure are further illustrated by and described with reference to apparatus diagrams, system diagrams, and flowcharts that relate to inter-operator coordination scheme for channel access in shared spectrum wireless communications.

FIG. 1 illustrates an example of a wireless communications system 100 in accordance with various aspects of the present disclosure. The wireless communications system 100 includes APs 105, stations 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

APs 105 may wirelessly communicate with stations 115 via one or more base station antennas. APs 105 described herein may include or may be referred to by those skilled in the art as a base station, a base transceiver station, a radio base station, an AP, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include APs 105 of different types (e.g., macro base stations or small cell base stations). The stations 115 described herein may be able to communicate with various types of APs 105 and network equipment including macro eNBs, small cell eNBs, gNBs, relay base stations, and the like.

Each AP 105 may be associated with a particular geographic coverage area 110 in which communications with various stations 115 is supported. Each AP 105 may provide communication coverage for a respective geographic coverage area 110 via communication links 125, and communication links 125 between an AP 105 and a station 115 may utilize one or more carriers. Communication links 125 shown in wireless communications system 100 may include uplink transmissions from a station 115 to an AP 105, or downlink transmissions, from an AP 105 to a station 115. Downlink transmissions may also be called forward link transmissions while uplink transmissions may also be called reverse link transmissions.

The geographic coverage area 110 for an AP 105 may be divided into sectors making up only a portion of the geographic coverage area 110, and each sector may be associated with a cell. For example, each AP 105 may provide communication coverage for a macro cell, a small cell, a hot spot, or other types of cells, or various combinations thereof. In some examples, an AP 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same AP 105 or by different APs 105. The wireless communications system 100 may include, for example, a heterogeneous LTE/LTE-A or NR network in which different types of APs 105 provide coverage for various geographic coverage areas 110.

The term "cell" refers to a logical communication entity used for communication with an AP 105, such as a cellular base station (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

Stations 115 may be dispersed throughout the wireless communications system 100, and each station 115 may be stationary or mobile. A station 115 may also be referred to as a user equipment (UE), mobile device, a wireless device, a remote device, a handheld device, or a subscriber device, or some other suitable terminology, where the "device" may also be referred to as a unit, a station, a terminal, or a client. A station 115 may also be a personal electronic device such as a cellular phone, a personal digital assistant (PDA), a tablet computer, a laptop computer, or a personal computer. In some examples, a station 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some stations 115, such as MTC or IoT UEs, may be low cost or low complexity devices, and may provide for automated communication between machines (e.g., via Machine-to-Machine (M2M) communication). M2M communication or MTC may refer to data communication technologies that allow devices to communicate with one another or an AP 105 without human intervention. In some examples, M2M communication or MTC may include communications from devices that integrate sensors or meters to measure or capture information and relay that information to a central server or application program that can make use of the information or present the information to humans interacting with the program or application. Some stations 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a station 115 may also be able to communicate directly with other stations 115 (e.g., using a peer-to-peer (P2P) or device-to-device (D2D) protocol). One or more of a group of stations 115 utilizing D2D communications may be within the geographic coverage area 110 of an AP 105. Other stations 115 in such a group may be outside the geographic coverage area 110 of an AP 105, or be otherwise unable to receive transmissions from an AP 105. In some cases, groups of stations 115 communicating via D2D communications may utilize a one-to-many (1:M) system in which each station 115 transmits to every other station 115 in the group. In some cases, an AP 105 facilitates the scheduling of resources for D2D communications. In other cases, D2D communications are carried out between stations 115 without the involvement of an AP 105.

APs 105 may communicate with a core network 130 and with one another. For example, APs 105 may interface with the core network 130 through backhaul links 132 (e.g., via an S1 or other interface). APs 105 may communicate with one another over backhaul links 134 (e.g., via an X2 or other interface) either directly (e.g., directly between APs 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for stations 115 served by APs 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as an AP 105, may include subcomponents such as an access network entity, which may be an example of an access node controller (ANC). Each access network entity may communicate with stations 115 through a number of other access network transmission entities, which may be referred to as a radio head, a smart radio head, or a transmission/reception point (TRP). In some configurations, various functions of each access network entity or AP 105 may be distributed across various network devices (e.g., radio heads and access network controllers) or consolidated into a single network device (e.g., an AP 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to stations 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between stations 115 and APs 105, and EHF antennas of the respective devices may be even smaller and more closely spaced than UHF antennas. In some cases, this may facilitate use of antenna arrays within a station 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as APs 105 and stations 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, an AP 105 or station 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., an AP 105) and a receiving device (e.g., a station 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., an AP 105 or a station 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, an AP 105 may use multiple antennas or antenna arrays to conduct beamforming operations for directional communications with a station 115. For instance, some signals (e.g. synchronization signals, reference signals, beam selection signals, or other control signals) may be transmitted by an AP 105 multiple times in different directions, which may include a signal being transmitted according to different beamforming weight sets associated with different directions of transmission. Transmissions in different beam directions may be used to identify (e.g., by the AP 105 or a receiving device, such as a station 115) a beam direction for subsequent transmission and/or reception by the AP 105. Some signals, such as data signals associated with a particular receiving device, may be transmitted by an AP 105 in a single beam direction (e.g., a direction associated with the receiving device, such as a station 115). In some examples, the beam direction associated with transmissions along a single beam direction may be determined based on a signal that was transmitted in different beam directions. For example, a station 115 may receive one or more of the signals transmitted by the AP 105 in different directions, and the station 115 may report to the AP 105 an indication of the signal it received with a highest signal quality, or an otherwise acceptable signal quality. Although these techniques are described with reference to signals transmitted in one or more directions by an AP 105, a station 115 may employ similar techniques for transmitting signals multiple times in different directions (e.g., for identifying a beam direction for subsequent transmission or reception by the station 115), or transmitting a signal in a single direction (e.g., for transmitting data to a receiving device).

A receiving device (e.g., a station 115, which may be an example of a mmW receiving device) may try multiple receive beams when receiving various signals from the AP 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of an AP 105 or station 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with an AP 105 may be located in diverse geographic locations. An AP 105 may have an antenna array with a number of rows and columns of antenna ports that the AP 105 may use to support beamforming of communications with a station 115. Likewise, a station 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a station 115 and an AP 105 or core network 130 supporting radio bearers for user plane data. At the Physical (PHY) layer, transport channels may be mapped to physical channels.

In some cases, stations 115 and APs 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a station 115 and an AP 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by stations 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served station 115 may be configured for operating over portions or all of the carrier bandwidth. In other examples, some stations 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a station 115 receives and the higher the order of the modulation scheme, the higher the data rate may be for the station 115. In MIMO systems, a wireless communications resource may refer to a combination of a radio frequency spectrum resource, a time resource, and a spatial resource (e.g., spatial layers), and the use of multiple spatial layers may further increase the data rate for communications with a station 115.

Devices of the wireless communications system 100 (e.g., APs 105 or stations 115) may have a hardware configuration that supports communications over a particular carrier bandwidth, or may be configurable to support communications over one of a set of carrier bandwidths. In some examples, the wireless communications system 100 may include APs 105 and/or UEs that can support simultaneous communications via carriers associated with more than one different carrier bandwidth.

Wireless communications system 100 may support communication with a station 115 on multiple cells or carriers, a feature which may be referred to as carrier aggregation (CA) or multi-carrier operation. A station 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by stations 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a station 115 or AP 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

According to techniques described herein, wireless communications system 100 may support coordination techniques for base stations or APs 105 configured to operate in a shared radio frequency spectrum band. APs 105 from different operators may share the same radio frequency spectrum band to perform downlink transmissions. APs 105 may often use coordinated spatial techniques, such as CoMP to perform transmissions in a shared spectrum. More specifically, APs 105 may be arranged into a cluster. A cluster may represent a set of nearby located APs 105, which are spatially far from other APs 105 that are included in any other cluster. In a cluster, APs 105 from the same operator are arranged into a CoMP cooperation set. The APs in a cluster may use zero-forcing block diagonal (ZFBD) transmission beamforming in downlink and/or joint linear minimum mean square error (LMMSE) in uplink.

In some implementations, APs 105 from a first cluster and APs 105 from a second cluster may use SDM to determine channel access priority between different clusters. SDM allows APs 105 of multiple clusters to transmit during the same transmission opportunity. In some cases, APs 105 of a primary cluster (or a primary operator) may have priority to a shared channel during a transmission opportunity, and a secondary cluster may determine a remaining degree of freedom available to the second cluster for selectively scheduling transmissions during the same transmission opportunity. However, SDM is effective when the remaining degree of freedom is accurately estimated. The remaining degree of freedom may be accurately estimated using perfect transmission beamforming nulling. In some cases, spatially close stations 115 may have an effect on the transmission beamforming nulling. Therefore, to reduce interference, the primary cluster may indicate in a broadcast identification information of each AP 105 of the primary cluster that is scheduled to perform a downlink transmission during an upcoming transmission opportunity. An AP 105 of the secondary cluster may match each of its stations to a corresponding AP 105 of the primary cluster based on a spatial characteristic or parameter of the station 115. The secondary cluster may determine whether the corresponding APs 105 of the first cluster matched to stations in the set of APs 105 indicated in the broadcast by the primary cluster. The secondary cluster may then selectively blacklist one or more of its stations 115 during the upcoming transmission opportunity. The secondary cluster may perform downlink transmission to a selected set of stations during the upcoming transmission opportunity that have not been blacklisted for the transmission opportunity.

Figure 2:
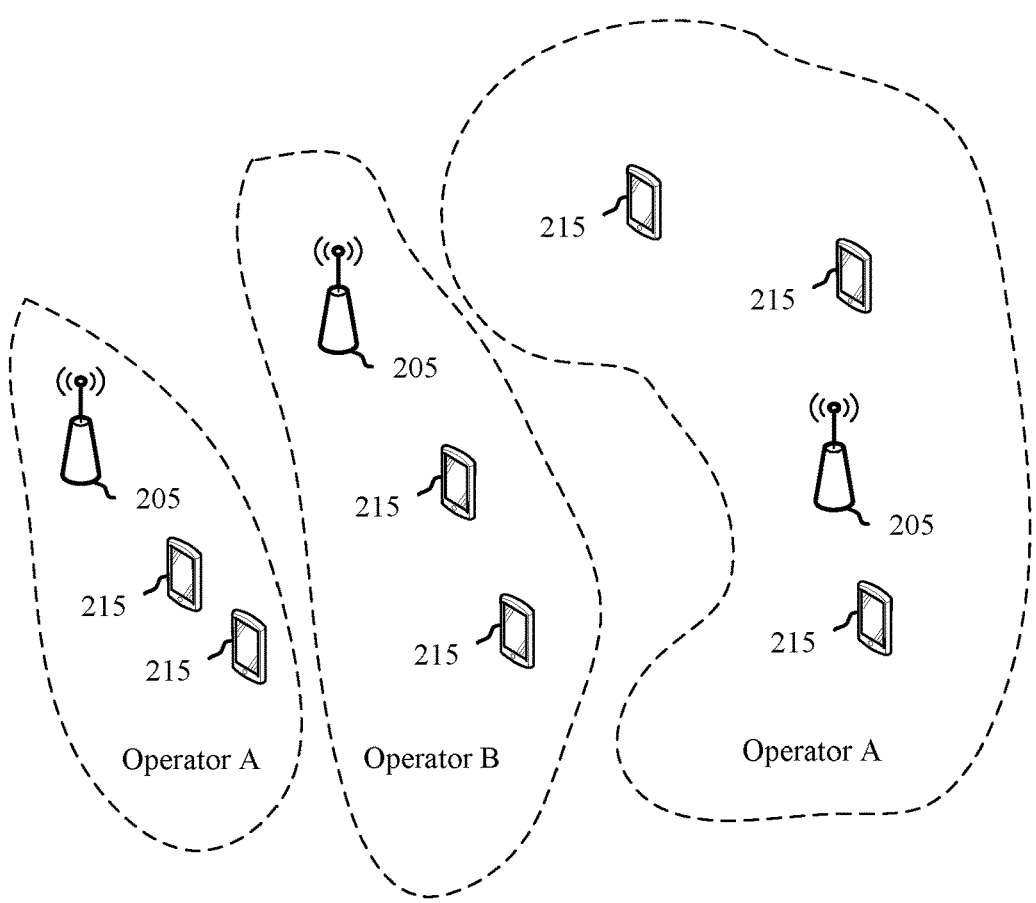
FIG. 2 illustrates an example of a wireless communications system that supports inter-operator coordination for channel access in shared spectrum in accordance with various aspects of the present disclosure.

FIG. 2 illustrates an example of a wireless communications system 200 that supports inter-operator coordination for channel access in shared spectrum in accordance with various aspects of the present disclosure. In some examples, the wireless communications system 200 may include a number of APs 205 (e.g., APs associated with a first cluster and APs associated with a second cluster) and a number of stations 215 (e.g., stations associated with a first cluster and stations associated with a second cluster). The APs 205 may be examples of aspects of the APs 105 described with reference to FIG. 1, and the stations 215 may be examples of the stations 115 described with reference to FIG. 1.

In some examples, different APs 205 may be associated with different operators (e.g., different MNOs). In one example, which will be described in detail with reference to FIG. 2, the first AP 205, and a second AP 205 may be associated with a common operator, but third AP 205 may be associated with one or more other operators. Each of the APs 205 may communicate with one or more of the stations 215 over one or more channels, in one or more radio frequency spectrum bands. In some examples, APs 205 associated with different operators may use a shared radio frequency spectrum band to communicate with their stations 215.

In the example of FIG. 2, some APs 205 and stations 215 are associated with Operator A and other APs and stations are associated with Operator B. In some examples, Operator A may be a primary operator and Operator B may be a secondary operator. In a shared radio frequency spectrum band, APs 205 associated with different operators may be synchronized with each other. For example, APs 205 of multiple operators may be configured to transmit during the same transmission opportunity. In such examples, a primary operator may have priority to a shared channel during a transmission opportunity, and a secondary operator may determine a remaining degree of freedom available during the same transmission opportunity. In the example of FIG. 2, if Operator A is a primary operator, then Operator A may have priority to access the shared channel. Operator B may then monitor for the remaining degree of freedom and may occupy the unused spatial resources of the shared channel.

However, the remaining degree of freedom may be accurately estimated using perfect transmission beamforming nulling techniques. In some cases, spatially close stations may affect transmission beamforming nulling accuracy.

Referring to the example of FIG. 2, some stations 215 belonging to Operator B may be spatially close to some stations belonging to Operator A. Therefore, to reduce interference, Operator A may indicate in a broadcast message, identification information of each AP 205 of Operator A that is scheduled to perform a downlink transmission during an upcoming transmission opportunity. In some cases, Operator A may broadcast the ID of these APs 205 during a contention interval. An AP 205 of Operator B may be configured to match each of its stations 215 to a corresponding AP 205 of the Operator A based on a spatial characteristic or parameter of that station 215. Operator B may then selectively blacklist one or more of its stations 215 during the upcoming transmission opportunity if the corresponding APs 205 of the first operator matched to those stations are in the set of APs indicated in the broadcast by Operator A. After the agreement between Operator A and Operator B, Operator B may perform downlink transmission to a selected set of stations 215 during the upcoming transmission opportunity that have not been blacklisted for the transmission opportunity.

Figure 3:
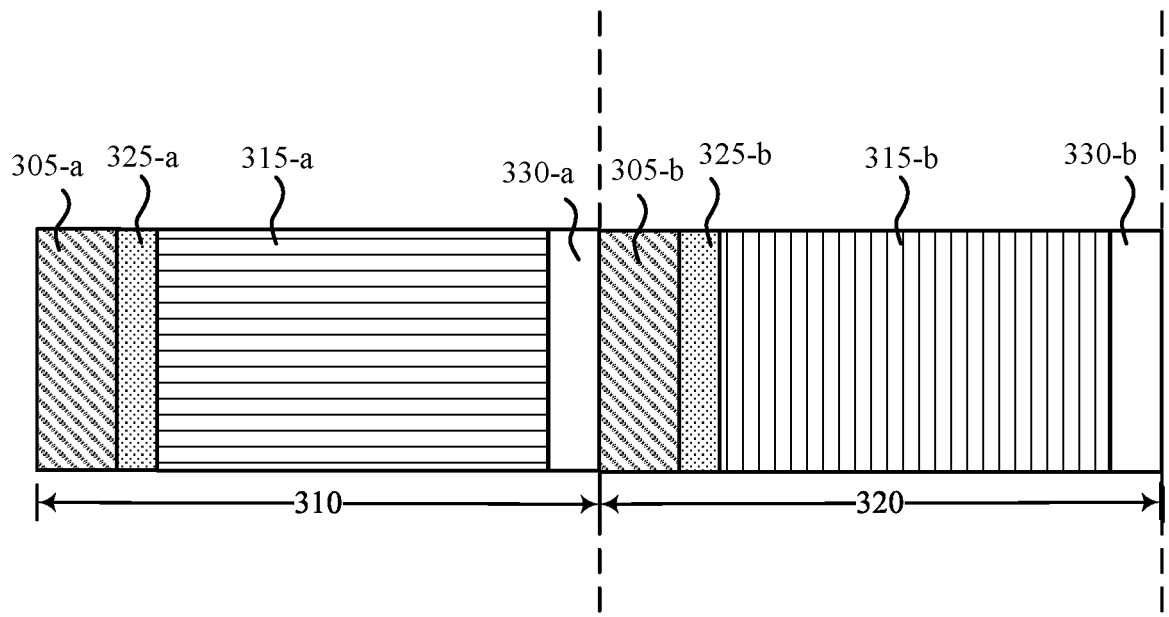
FIG. 3 illustrates an example of transmission opportunities that supports inter-operator coordination for channel access in shared spectrum in accordance with various aspects of the present disclosure.

FIG. 3 illustrates an example of transmission opportunities 300 that supports inter-operator coordination for channel access in a shared spectrum in accordance with various aspects of the present disclosure. In some examples, transmission opportunities 300 may implement aspects of wireless communications systems 100 or 200 as described with reference to FIGS. 1 and 2. As shown, transmission opportunities 300 include a first transmission opportunity 310 and a second transmission opportunity 320.

In the example of FIG. 3, APs from two or more operators are configured to synchronously transmit over a shared spectrum. In some implementations, the APs from different operators may use CoMP while transmitting over a shared spectrum. CoMP describes a synchronized shared spectrum design where two or more operators are synchronized with each other according to a global clock. An AP 105 or 205 may be configured operate under a CoMP scenario. A first AP 105 or 205 may belong to a first operator and a second AP 105 or 205 may belong to a second operator. In the example of FIG. 3, the first operator may be a primary operator during the first transmission opportunity and the second operator may be the primary operator during the second transmission opportunity. During the first transmission opportunity 310, each operator may know a start time of a common contention interval 305-*a* and transmission details of a primary operator for an upcoming transmission opportunity. For example, during the common contention interval 305-*a*, both the first operator and the second operator may be configured to receive an indication of a primary operator for the first transmission opportunity 310.

In some cases, the first operator and the second operator may switch between designations as primary operator or secondary operator for different transmission opportunities. In the example of FIG. 3, the channel access priority between the first operator and the second operator is defined using TDM. More specifically, when both operators try to attain resources in the shared spectrum, the primary operator has an advantage of choosing a random access channel (RACH) for transmitting data. For example, during the first transmission opportunity 310, an AP 105 or 205 of the primary operator accesses the channel by sending reservation signals at the beginning of the common contention interval 305-*a*. In some implementations, all APs 105 or 205 from one or more different operators may listen to this common contention interval 305-*a* and may receive an indication that the first operator is the primary operator for the transmission opportunity 310.

After transmitting a reservation signal during common contention interval 305-a, AP 105 or 205 belonging to the primary operator (the first operator in this case) may transmit training phase signals 325-a to finalize the rate control for transmission (which may include rank, transmission beam forming, and modulation and coding scheme (MCS) information). The training phase signals 325-a may include an indication of a tentative pilot rank and tentative transmission beamforming parameters. In one example, the AP 105 or 205 belonging to the primary operator may transmit data 315-a after transmission of training phase signals 325-a. After the window of data 315-a transmission from the primary operator, the first transmission opportunity 310 may include a location scheduled for acknowledgements 330-a.

As further shown in the example of FIG. 3, during the second transmission opportunity 320, the second operator may be designated as a primary operator. For example, during the common contention interval 305-b, both the first operator and the second operator may be configured to receive an indication that the second operator is a primary operator for the second transmission opportunity 320. During the second transmission opportunity 320, an AP 105 or 205 of the primary operator (the second operator in this case) accesses the channel by sending reservation signals at the beginning of the common contention interval 305-b. In some implementations, all APs 105 or 205 from one or more different operators may listen to the common contention interval 305-a and may receive an indication that the second operator is the primary operator for the second transmission opportunity 320. After transmitting a reservation signal during the common contention interval 305-b, AP 105 or 205 belonging to the primary operator (the second operator in this case) may transmit training phase signals 325-b to finalize the rate control for transmission (which may include rank, transmission beam forming, and MCS information). Among other components, the training phase signals 325-b may include an indication of a tentative pilot rank and tentative transmission beamforming parameters. In one example, the AP 105 or 205 belonging to the second operator may transmit data 315-b after transmission of training phase signals 325-b. After the window of data 315-b transmission from the primary operator (the second operator in this case), the transmission opportunity 320 may include a location scheduled for acknowledgements 330-b.

In CoMP systems using TDM, there may be no periodic feedback from a receiver to a transmitter for a secondary operator that does not have access to a shared channel. Also, the transmission mode in downlink function may be fixed for a primary operator. For example, if an operator chooses rank 1 for one user and rank 2 for another user, the ranks for the users may remain the same during an entire transmission opportunity due to the unavailability of channel state information (CSI) feedback. Therefore, even if APs associated with the primary operator do not have enough data to transmit to fully occupy the transmission opportunity 310, APs of the secondary operator with downlink data to transmit may be unable to access the unused resources in transmission opportunity 310, which may result in lower throughput and channel efficiency.

Figure 4:
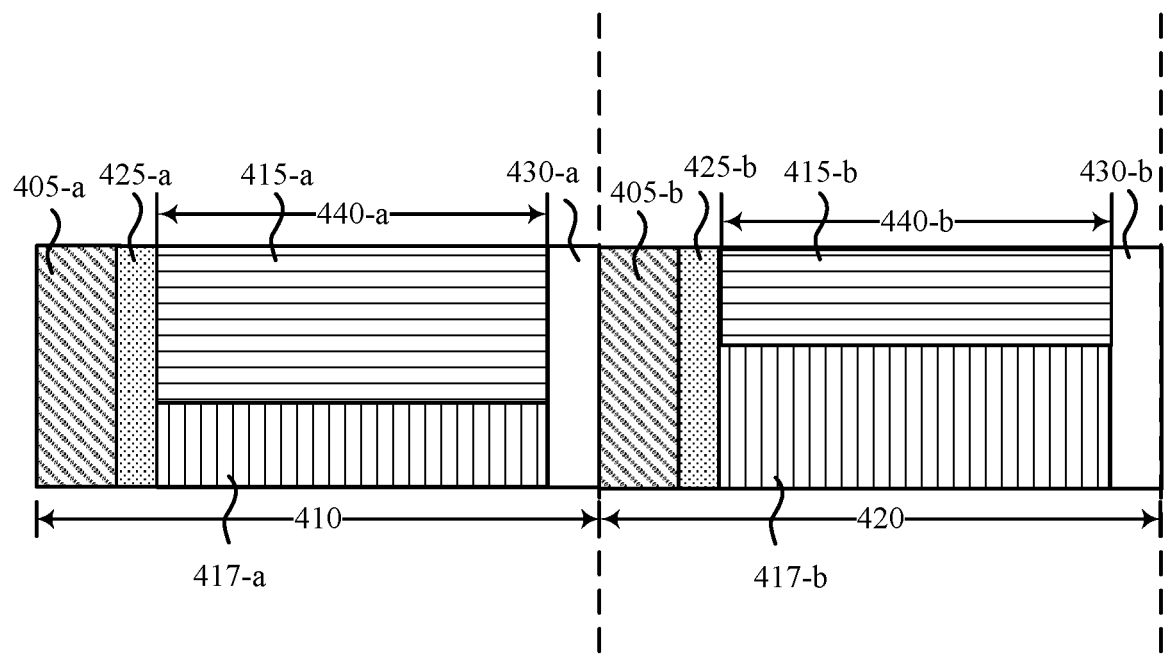
FIG. 4 illustrates an example of transmission opportunities that supports inter-operator coordination for channel access in shared spectrum in accordance with various aspects of the present disclosure.

FIG. 4 illustrates an example of transmission opportunities 400 that supports inter-operator coordination for channel access in shared spectrum in accordance with various aspects of the present disclosure. In some examples, transmission opportunities 400 may implement aspects of wireless communications systems 100 or 200 as described with reference to FIGS. 1 and 2. As shown, transmission opportunities 400 include a first transmission opportunity 410 and a second transmission opportunity 420.

APs from two or more operators are configured to synchronously transmit over a shared spectrum. In some implementations, the APs from different operators may use coordinated spatial techniques such as CoMP while transmitting over a shared spectrum, which may increase spectrum utilization. CoMP describes a synchronized shared spectrum design where two or more operators are synchronized with each other according to a global clock. A first AP 105 or 205 belonging to a first operator and a second AP 105 or 205 belonging to a second operator may be configured operate under a CoMP scenario. In the example of FIG. 4, the channel access priority between the first operator and the second operator is defined using SDM. In contrast to TDM, SDM may allow APs of multiple operators to coordinate with one another and transmit during the same transmission opportunity. In SDM systems, two or more operators may be allowed to serve their own stations without interfering with one another. During the first transmission opportunity 410, each operator may know a start time of a common contention interval 405-a and details of the upcoming transmissions. For example, a primary operator may be aware of the upcoming transmissions of a secondary operator. Similarly, the secondary operator may be aware of upcoming transmissions of the primary operator. In an example where a CoMP cluster has 4 APs, of which each has 4 antennas, then the total available degrees of freedom is 16. If the primary operator decides to serve 3 stations with 4 streams per station (taking up 12 of the available 16 degrees of freedom), then the remaining degree of freedom is 4. Therefore, the secondary operator may be configured to serve one station with a rank less than or equal to 4.

During a contention interval, each operator may reserve a number of stations that it intends to serve during a transmission opportunity. For example, during the common contention interval 405-a, both the first operator and the second operator may be configured to reserve a number of stations that each of them intends to serve during the first transmission opportunity 410. In such cases, a primary operator may have priority to resources on a shared channel, and a secondary operator may determine a remaining degree of freedom to selectively schedule transmissions during the same transmission opportunity to occupy the unused spatial resources of the shared channel. In the example of FIG. 4, one or more APs of the first operator may have the priority to reserve the shared channel based on the number of stations they intend to serve. The second operator (the secondary operator in this case) may then determine the remaining spatial resources for the first transmission opportunity 410, and may selectively schedule transmissions during the first transmission opportunity 410.

After the common contention interval 405-a, AP 105 or 205 belonging to the primary operator (the first operator in this case) and AP 105 or 205 belong to the secondary operator may transmit training phase signals 425-a to finalize the rate control for transmission (which may include rank, transmission beam forming, and MCS information). The training phase signals 425-a may include an indication of a tentative pilot rank and tentative transmission beamforming parameters. In one example, the AP 105 or 205 belonging to the primary operator may transmit data 415-a after transmission of the training phase signals 425-a. As described in FIG. 4, the first operator may not use all available resources to transmit data 415-a. Under such a scenario, the AP 105 or 205 belonging to the secondary operator (the second operator in this case) may determine a remaining degree of freedom for the channel and may transmit data 417-*a* to occupy the remaining degree of freedom. After the window 440-*a* of data transmission from the primary operator and the secondary operator, the first transmission opportunity 410 may include a location scheduled for acknowledgements 430-*a*.

As further shown in the example of FIG. 4, during the second transmission opportunity 320, the second operator may be a primary operator and the first operator may be a secondary operator. For example, during the common contention interval 405-*b*, both the first operator and the second operator may be configured to reserve a number of stations that each of them intends to serve during a second transmission opportunity 420. In this case, the second operator (the primary operator in this case) may have priority to a shared channel, and the first operator (the secondary operator in this case) may determine a remaining degree of freedom to selectively schedule transmissions during the same transmission opportunity. After the common contention interval 405-*b*, AP 105 or 205 belonging to the primary operator (the second operator in this case) and AP 105 or 205 belong to the secondary operator (the first operator in this case) may transmit training phase signals 425-*b* to finalize the rate control for transmission (for example rank, transmission beam forming, and MCS). The training phase signals 425-*b* may include an indication of a tentative pilot rank and tentative transmission beamforming parameters. In one example, the AP 105 or 205 belonging to the second operator (the primary operator in this example) may transmit data 415-*b* after transmission of the training phase signals 425-*b*. If the first operator has remaining resources available for transmission, the AP 105 or 205 belonging to the secondary operator (the first operator in this example) may determine a remaining degree of freedom and may transmit data 417-*b* to occupy the remaining degree of freedom. After the window 440-*b* of data transmission from the primary operator and the secondary operator, the second transmission opportunity 420 may include a location scheduled for acknowledgements 430-*a*.

As previously discussed with reference to FIG. 1, APs 105 may be arranged into a cluster. A cluster may represent a set of nearby located APs 105, which are spatially far from other APs 105 included in any other cluster. In a cluster, APs 105 from the same operator are arranged into a CoMP cooperation set. The APs 105 in a cluster may use ZFBD transmission beamforming in downlink and/or joint LMMSE in uplink. In the example of determining channel access priority for each operator, in each cluster, the secondary operator may use the channel when there is one or more remaining spatial domain degrees of freedom. In some cases, the secondary operator may serve the same downlink/uplink direction as the primary operator. Each operator may conduct an interference nulling technique directed towards the stations belonging to another operator.

However, the remaining degree of freedom may be accurately estimated using perfect transmission beamforming nulling. In some cases, spatially close stations may affect transmission beamforming nulling. More specifically, stations which are very close in the spatial domain may exhibit significant signal to noise ratio (SINR) degradation and multi-access interference. Similarly, moderately close pairs of stations may also lead to significant SINR degradation in the presence of channel information mismatch. In some cases, channel information mismatch may happen due to imperfect sounding reference signal (SRS) sounding. In some other examples, channel information mismatch may happen in the latter TTIs of a moderate-length transmission opportunity with a typical user mobility (e.g., user mobility of 3 kmph at 5 GHz band). Therefore, SDM in CoMP may be effectively used when the transmission beamforming nulling is perfect or when no stations belonging to different operators are located spatially close to each other.

In some cases, efficiency of a CoMP operation set may be improved by reducing the inter-operator blocking at the cost of more complicated inter-operator over the air (OTA) signaling. To effectively coordinate transmissions in a shared radio frequency spectrum, the secondary operator may know of a number of stations that the primary operator has scheduled for the upcoming transmission opportunity. The secondary operator may determine the stations scheduled by the primary operator by listening to corresponding SRSs associated with downlink transmission beamforming. In some examples, to effectively reduce interference, the primary operator may also listen to the SRSs from the secondary operator associated with downlink transmission beamforming.

Figure 5A:
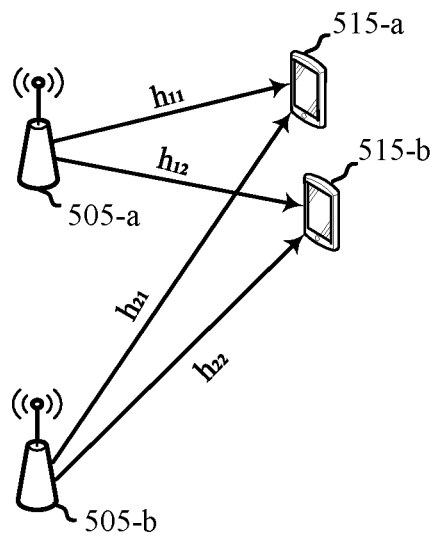
FIGS. 5A and 5B are examples spatial closeness calculations in wireless communications systems that support inter-operator coordination for channel access in shared spectrum in accordance with various aspects of the present disclosure.
Figure 5B:
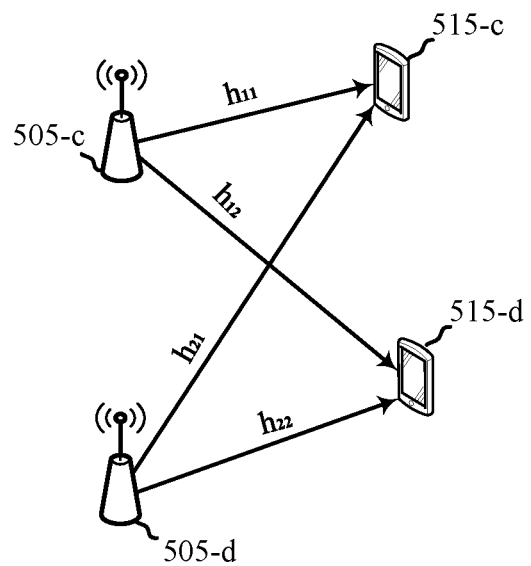

FIGS. 5A and 5B are examples spatial closeness calculations in wireless communications systems that supports inter-operator coordination for channel access in shared spectrum wireless communication in accordance with various aspects of the present disclosure.

In the example of FIG. 5A, AP 505-*a*, AP 505-*b*, station (or UE) 515-*a* and station 515-*b* may be spatially separated. In this example, $h_{11}$ represents a channel between AP 505-*a* and station 515-*a*, $h_{12}$ represents a channel between AP 505-*a* and station 515-*b*, $h_{21}$ represents a channel between AP 505-*b* and station 515-*a*, and $h_{22}$ represents a channel between AP 505-*b* and station 515-*b*. A Rayleigh flat fading model associated with different signal paths with different path losses may indicate attenuation according to the distributions: $E\{|h_{11}|\}=E\{|h_{12}|\}$, $E\{|h_{21}|\}=E\{|h_{22}|\}$, and $E\{|h_{11}|\}=10\times(E\{|h_{21}|\})$.

In the example of FIG. 5B, AP 505-*c*, AP 505-*d*, station 515-*c* and station 515-*d* may be spatially separated. In this example, $h_{11}$ represents a channel between AP 505-*c* and station 515-*c*, $h_{12}$ represents a channel between AP 505-*c* and station 515-*d*, $h_{21}$ represents a channel between AP 505-*d* and station 515-*c*, and $h_{22}$ represents a channel between AP 505-*d* and station 515-*d*. A Rayleigh flat fading model associated with different signal paths may indicate attenuation according to the distributions: $E\{|h_{11}|\}=E\{|h_{22}|\}$, $E\{|h_{21}|\}=E\{|h_{12}|\}$, and $E\{|h_{11}|\}=10\times(E\{|h_{21}|\})$.

In an example of a first CoMP set including AP 505-*a*, AP 505-*b*, station 515-*a*, and station 515-*b* and of a second CoMP set including AP 505-*c*, AP 505-*d*, station 515-*c*, and station 515-*d*, a composite channel $h_1$ may be defined as a row vector $[h_{11};h_{21}]$ and a composite channel $h_2$ may be defined as a row vector $[h_{12};h_{22}]$. In this example, the spatial correlation may be defined as abs $$\left(\frac{h_1^H h_2}{|h_1||h_2|}\right),$$

where H is Hermitian. In some cases, a composite channel may take the form of higher dimensional vectors or matrices.

Upon calculating the spatial correlation value, it is determined that the system described in FIG. 5B has a more uniform correlation when compared to the system described in FIG. 5A. In some cases, spatially close stations may lead to smaller peak nulling gain as well as faster signal degradation in the presence of channel mismatches. Also, the presence of spatially close stations may impact transmissions to non-spatially-close stations through CQI back-off, with a typical outer-loop design/implementation.

Figure 6:
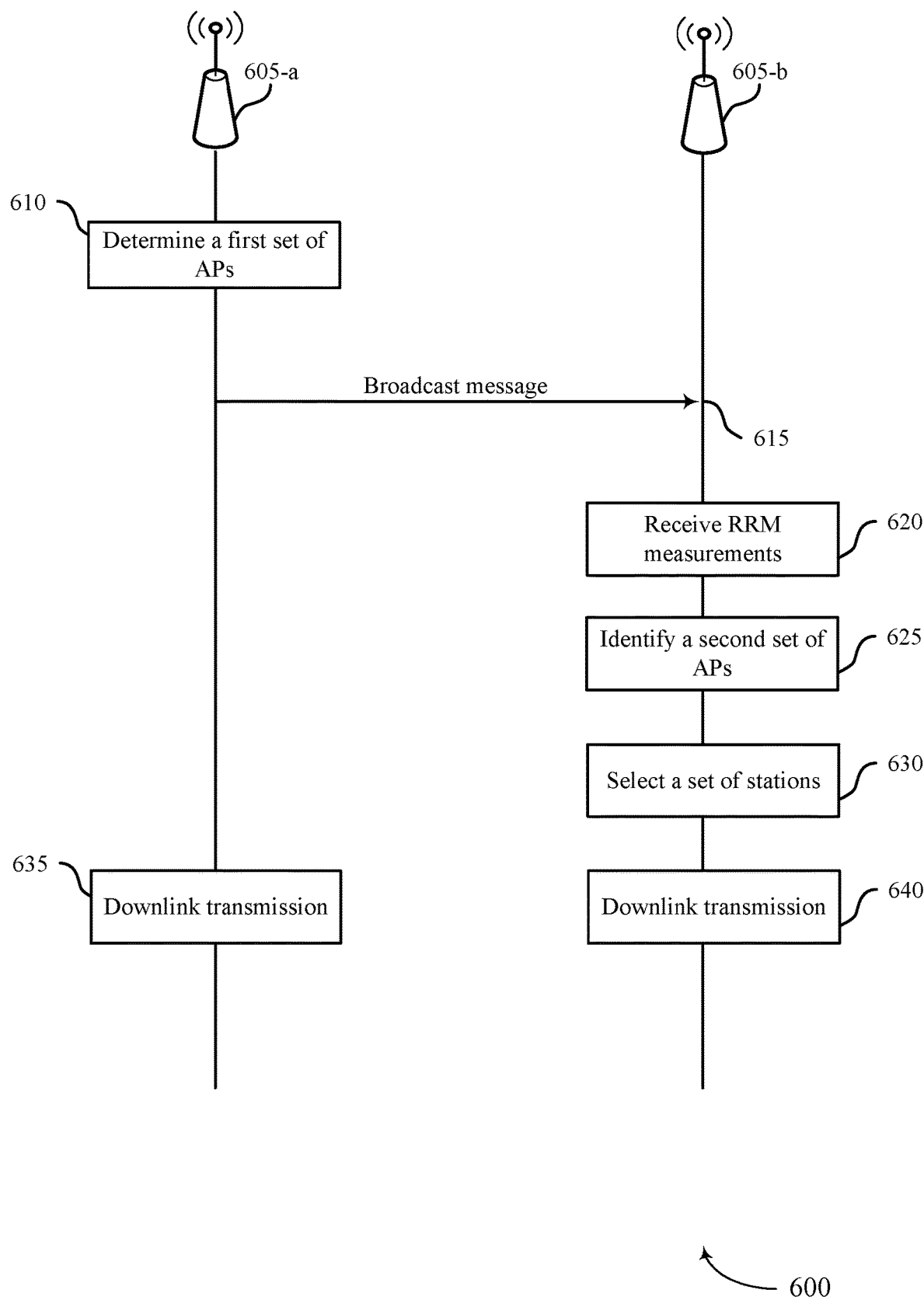
FIG. 6 illustrates an example of a process flow that supports inter-operator coordination for channel access in shared spectrum in accordance with various aspects of the present disclosure.

FIG. 6 illustrates an example of a process flow 600 that supports inter-operator coordination for channel access in shared spectrum in accordance with various aspects of the present disclosure. In some examples, process flow 600 may implement aspects of wireless communications system 100. Process flow 600 may include a first AP 605-a belonging to a primary operator and a second AP 605-b belonging to a secondary operator, which may represent aspects of techniques performed by an AP 105 or 205 as described with reference to FIGS. 1 through 5. In some examples, AP 605-a may be a first entity cluster associated with a primary operator and AP 605-b may be a second entity cluster associated with a secondary operator.

At block 610, AP 605-a may identify a first set of APs scheduled to perform downlink transmissions over a shared radio frequency spectrum band during a transmission opportunity. In some examples, the set of APs may belong to the same cluster (e.g., same operator) and be arranged into a CoMP operation set. In some cases, both AP 605-a and the first set of APs may belong to the primary cluster (e.g., primary operator). In some examples, the primary operator may be configured to choose a set of stations scheduled to receive downlink transmissions during a transmission opportunity. The first APs may be determined based on the cluster of stations.

At block 615, AP 605-a may broadcast a message to AP 605-b. In some examples, a number of APs belonging to the secondary operator may receive the broadcast message. In some examples, AP 605-b, upon receiving the broadcast message may notify other APs belonging to the same operator. In some cases, the broadcast message may include identification information for each AP included in the first set of APs. In some cases, the identification information may include IDs of APs scheduled to perform downlink transmissions during an upcoming transmission opportunity. In some examples, the broadcast message may include a spatial signature associated with each AP included in the first set of APs. For example, the AP 605-a may determine a spatial signature associated with each AP as a binary value signature. For example, if a CoMP cluster of a primary operator has 4 APs, and $AP_1$ and $AP_3$ are scheduled to transmit during an upcoming transmission opportunity, then the binary-value signature for $AP_1$ may be broadcasted as [1 0 0 0] and the binary-value signature for $AP_3$ may be broadcasted as [0 0 1 0]. In some cases, the tolerated correlation may be zero.

In some examples, the broadcast message may include a spatial signature for each station chosen by the AP 605-a to receive downlink transmissions during an upcoming transmission opportunity. In some cases, the spatial signatures may be based on a continuous path-loss value. For example, the AP 605-a may determine a spatial signature a station as $$\left[1, \frac{PL_2}{PL_1}, \frac{PL_3}{PL_1}, \frac{PL_4}{PL_1}\right],$$

where $PL_i$ is the path loss between the station to $AP_i$.

In some examples, AP 605-a may determine two APs belonging to separate operators are close to each other. In some cases, the spatial separation between APs of different operators may be calculated using RRM measurement. In some examples, the broadcast message from AP 605-a may include IDs of APs of the secondary operator, that are spatially close to APs of the primary operator. In some examples, AP 605-a may use a similar approach to determine whether two stations belonging to separate operators (or separate clusters) are close to each other. In some cases, the spatial separation between stations of different operators may be calculated using RRM measurement. In some examples, the broadcast message from AP 605-a may include IDs of stations of the secondary cluster (or secondary operator) that are spatially close to stations of the primary operator. In some examples, the broadcast message may further include global positioning system (GPS) locations of the stations of the primary operator, which are scheduled to receive downlink transmission during an upcoming transmission opportunity.

At block 620, AP 605-b of the secondary operator may receive an RRM measurement from each station associated with the secondary operator. In some cases, AP 605-b may calculate a path loss for each station associated with the secondary operator to the corresponding AP of the primary cluster (such as primary operator) based on the received RRM measurement.

At block 625, AP 605-b of the secondary operator may identify a set of APs associated with the primary operator. In some cases, the set of APs associated with the primary operator may be based on the calculated path loss for each station associated with the secondary operator. For example, the AP 605-b may define for each of its stations, a pseudo-serving AP (i.e., the AP of the primary operator exhibiting the smallest path-loss). In some cases, the set of APs may include the pseudo-serving APs for each station associated with the secondary operator.

At block 630, AP 605-b of the secondary operator may be configured to select a set of stations associated with the secondary operator. In some implementations, the AP 605-b may select a set of blacklisted stations associated with the secondary operator for the transmission opportunity. In some cases, the blacklisted stations may be selected based on the first set of APs and the second set of APs. For example, upon determining the set of pseudo-serving APs for each station associated with the secondary operator, the secondary operator may agree to not schedule downlink transmission for any station whose pseudo-serving AP ID is included in the IDs broadcasted by AP 605-a. More specifically, if the secondary operator determines that any number of its stations is spatially close to the scheduled APs of the primary cluster, then the secondary cluster may agree to not schedule transmissions to the spatially close stations.

In some cases, upon receiving the binary signatures from the primary operator (such as over the broadcast message), AP 605-b may determine a spatial signature of each station associated with the secondary operator. In some implementations, for each station, AP 605-b may determine a correlation between the spatial signature for that station and the spatial signature associated with each AP in the first set of APs associated with the primary operator. In some cases, AP 605-b may select the set of blacklisted stations if the determined correlation satisfies a correlation threshold.

In some examples, upon receiving the spatial signatures for stations associated with the primary operator, the secondary operator may determine for each station, a correlation between the spatial signature of that station and the spatial signature for each station included in the set of stations associated with the primary operator. For example, the secondary operator agrees not to serve any station whose path-loss signature has a larger-than-threshold correlation with any of the broadcast signatures of stations associated with the primary operator.

In some examples, upon receiving the indication of stations associated with the primary operator that are scheduled to receive downlink transmissions during an upcoming transmission opportunity, the AP 605-*b* may exclude any stations of the secondary operator whose serving AP is close to any station that has been scheduled by the primary operator.

At block 635, AP 605-*a* belonging to the primary operator may facilitate the downlink transmissions for APs associated with the primary operator during a transmission opportunity.

At block 640, AP 605-*b* may selectively facilitate the downlink transmission of APs to a second set of stations associated with the secondary operator simultaneously with the APs of the primary operator. In some examples, the second set of stations is based on the set of blacklisted stations. In some cases, the downlink transmission is performed using a spatial division multiplexing technique between the primary operator and the secondary operator.

Figure 7:
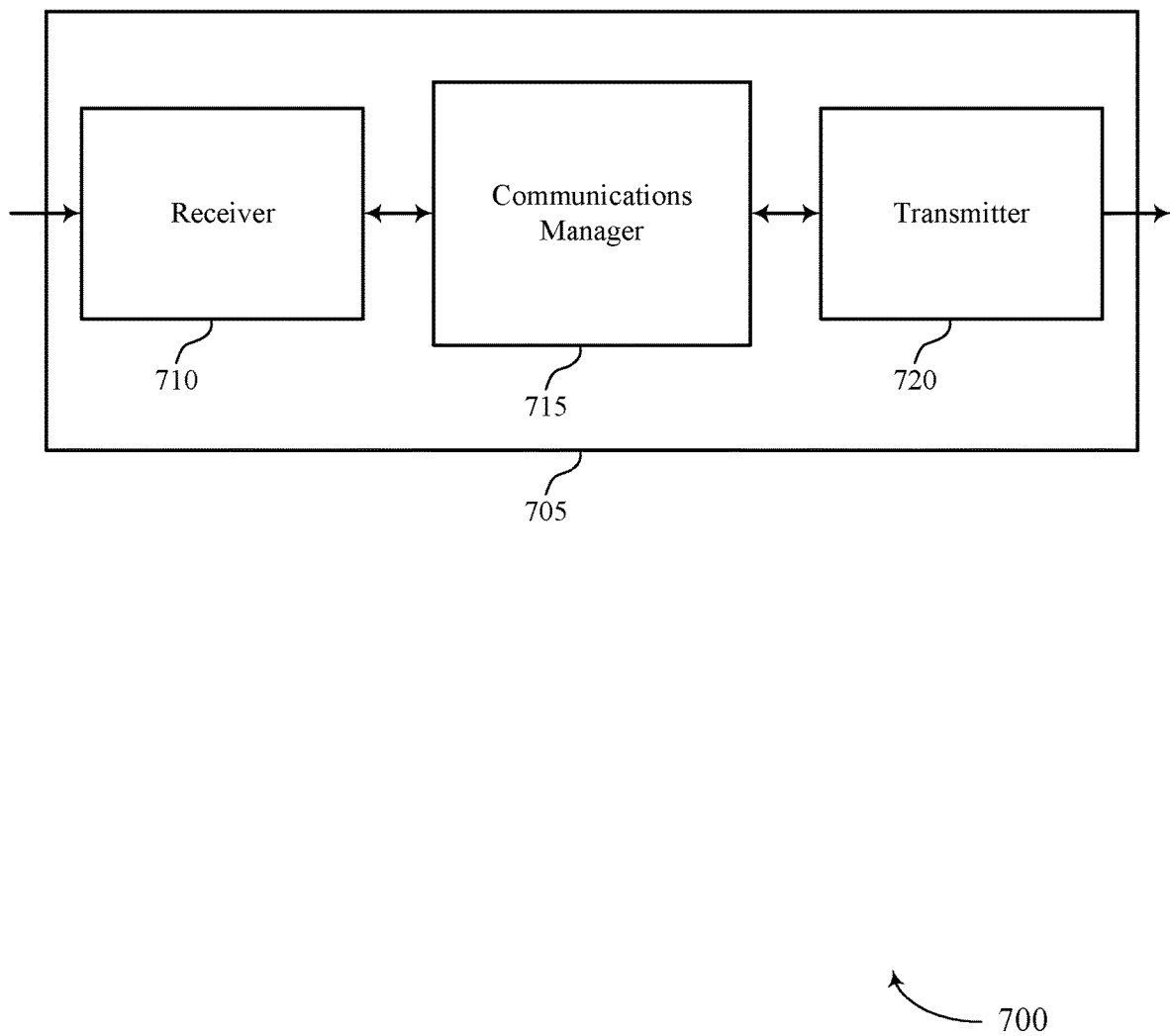
FIGS. 7 through 9 show block diagrams of a device that supports inter-operator coordination for channel access in shared spectrum in accordance with various aspects of the present disclosure.

FIG. 7 shows a block diagram 700 of a wireless device 705 that supports inter-operator coordination for channel access in shared spectrum in accordance with various aspects of the present disclosure. Wireless device 705 may be an example of aspects of an AP 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to inter-operator coordination for channel access in shared spectrum, etc.). Information may be passed on to other components of the device. The receiver 710 may be an example of aspects of the transceiver 1035 described with reference to FIG. 10. The receiver 710 may utilize a single antenna or a set of antennas.

In some implementations, receiver 710 may receive a broadcast message from a primary operator. In some cases, the broadcast message may include an identification of each AP included in the first set of APs. In some implementations, the receiver 710 may receive a spatial signature associated with each AP included in a first set of APs. In such examples, the first set of APs refer to APs of the primary operator, that are scheduled to perform downlink transmissions over a shared radio frequency spectrum during a transmission opportunity.

In some implementations, the receiver 710 may receive a spatial signature of each station included in a set of stations associated with the primary operator and receive from the primary operator an identification of at least one AP associated with a secondary operator. In some examples, a set of blacklisted stations associated with the secondary operator may be selected based on the received identification.

Communications manager 715 may be an example of aspects of the communications manager 1015 described with reference to FIG. 10. The communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, the communications manager 715 and/or at least some of its various sub-components may be a separate and distinct component in accordance with various aspects of the present disclosure. In other examples, the communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The communications manager 715 may identify a first set of APs of a primary cluster scheduled to perform downlink transmissions over a shared radio frequency spectrum band during a transmission opportunity. In some implementations, the communications manager 715 may identify a second set of APs including, for each station associated with the secondary cluster, a corresponding AP of the primary cluster selected based on a spatial characteristic or parameter of that station. In some implementations, the communications manager 715 may select a first set of blacklisted stations associated with the secondary cluster for the transmission opportunity. In some cases, the selecting is based on the first set of APs and the second set of APs.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

The transmitter 720 may also selectively perform at least one downlink transmission to a second set of stations associated with the secondary cluster during the transmission opportunity. In some cases, the second set of stations is based on the first set of blacklisted stations. In some cases, the transmitter 720 performs the at least one downlink transmission using a spatial division multiplexing technique between the primary cluster and the secondary cluster.

Figure 8:
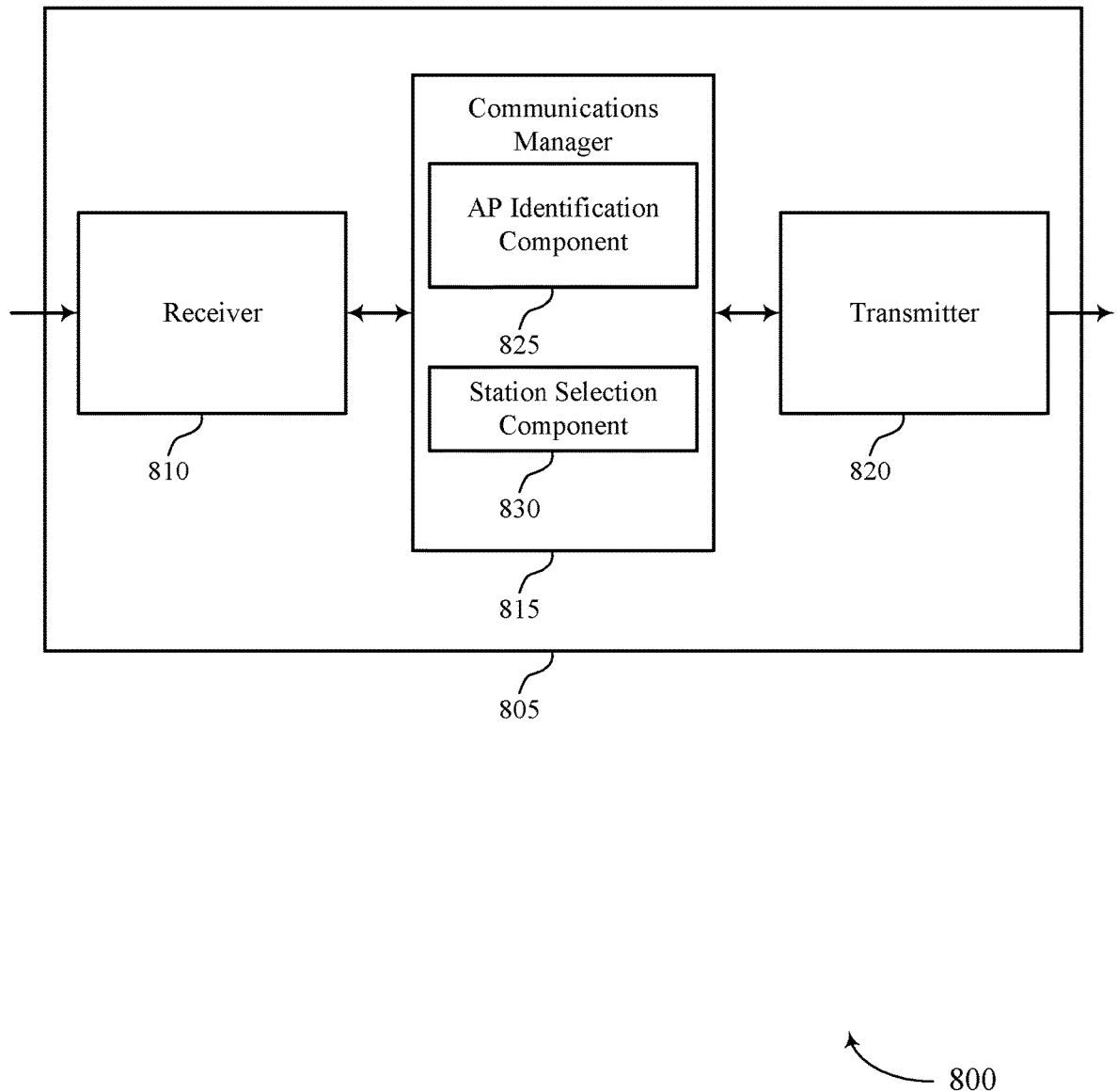

FIG. 8 shows a block diagram 800 of a wireless device 805 that supports inter-operator coordination for channel access in shared spectrum in accordance with various aspects of the present disclosure. Wireless device 805 may be an example of aspects of a wireless device 705 or an AP 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to inter-operator coordination for channel access in shared spectrum, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. The communications manager 815 may also include an AP identification component 825 and a station selection component 830.

The AP identification component 825 may identify a first set of APs of a primary cluster scheduled to perform downlink transmissions over a shared radio frequency spectrum band during a transmission opportunity. In some examples, the AP identification component 825 may identify a second set of APs, where, for each station associated with the secondary cluster, a corresponding AP of the primary cluster is selected based on a spatial characteristic or parameter of that station.

The station selection component 830 may select a first set of blacklisted stations associated with the secondary cluster for the transmission opportunity. In some cases, the selecting is based on the first set of APs and the second set of APs.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
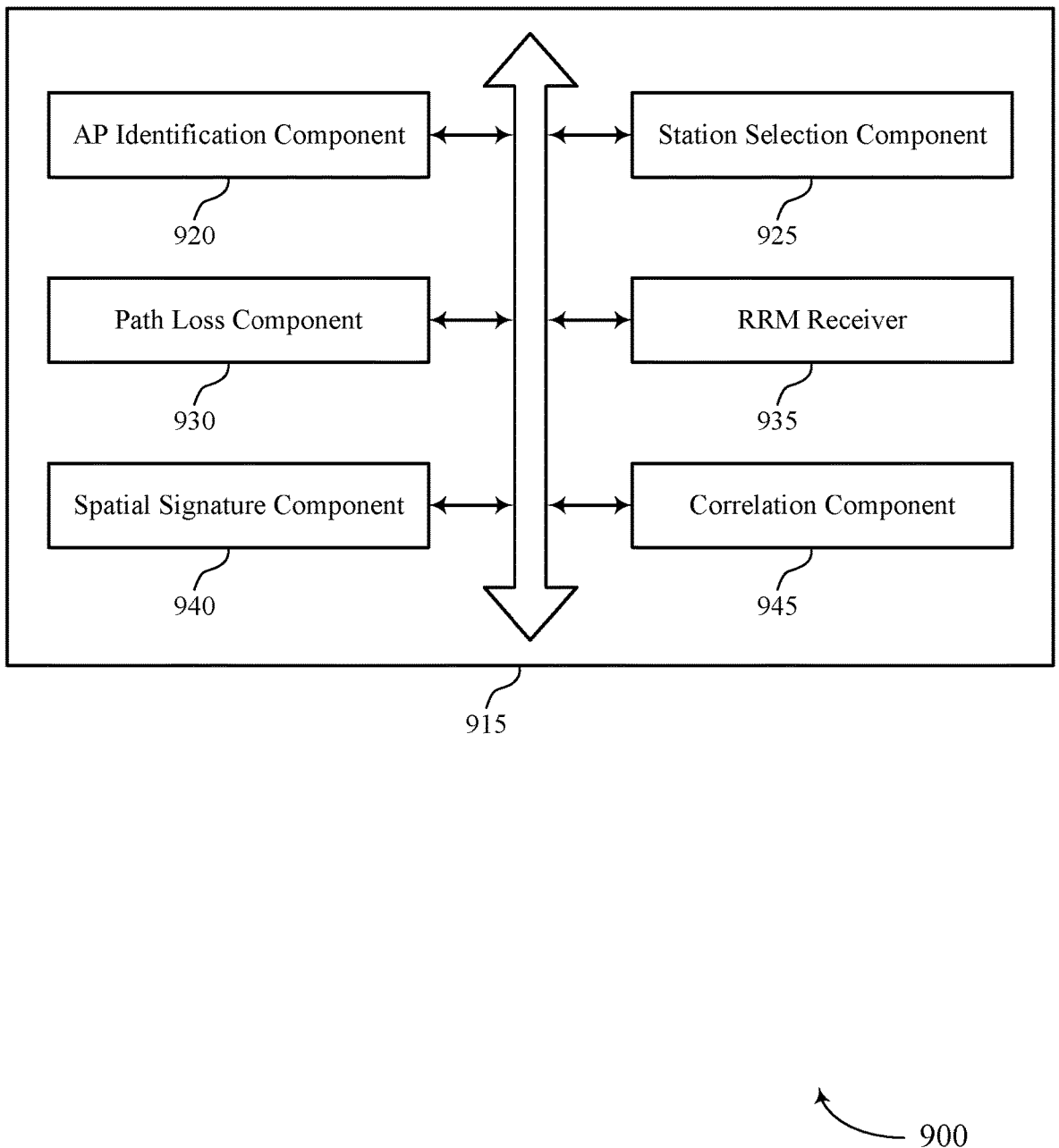

FIG. 9 shows a block diagram 900 of a communications manager 915 that supports inter-operator coordination for channel access in shared spectrum in accordance with various aspects of the present disclosure. The communications manager 915 may be an example of aspects of a communications manager 715, a communications manager 815, or a communications manager 1015 described with reference to FIGS. 7, 8, and 10. The communications manager 915 may include an AP identification component 920, a station selection component 925, a path loss component 930, an RRM receiver 935, a spatial signature component 940, and a correlation component 945. Each of these modules may communicate, directly or indirectly, with one another (e.g., via one or more buses).

The AP identification component 920 may identify a first set of APs of a primary cluster scheduled to perform downlink transmissions over a shared radio frequency spectrum band during a transmission opportunity. In some implementations, the AP identification component 920 may identify a second set of APs including, for each station associated with the secondary cluster, a corresponding AP of the primary cluster selected based on a spatial characteristic or parameter of that station.

The station selection component 925 may select a first set of blacklisted stations associated with the secondary cluster for the transmission opportunity. In some examples, the selecting is based on the first set of APs and the second set of APs.

The path loss component 930 may determine, for each station associated with the secondary cluster, a path loss to the corresponding AP of the primary cluster. In some cases, the spatial characteristic or parameter of the station includes the determined path loss. In some implementations, the path loss component 930 may determine the path loss for the at least one station associated with the secondary cluster based on an RRM measurement. In some examples, the path loss component 930 may receive the RRM measurement from the RRM receiver 935.

The RRM receiver 935 may receive an RRM measurement from at least one station associated with the secondary cluster.

The spatial signature component 940 may determine a spatial signature of each station associated with the secondary cluster based on the path loss between that station and each AP of the primary cluster.

The correlation component 945 may determine, for each station included in the set of stations associated with the secondary cluster, a correlation between the spatial signature of that station and the spatial signature associated with each AP of the first set of APs. In some cases, selecting the first set of blacklisted stations associated with the secondary cluster for the transmission opportunity is based on the determined correlation and a correlation threshold. In some implementations, the correlation component 945 may determine, for each station included in the set of stations associated with the secondary cluster, a correlation between the spatial signature of that station and the spatial signature for each station included in the set of stations associated with the primary cluster. In such examples, selecting the first set of blacklisted stations associated with the secondary cluster for the transmission opportunity is based on the determined correlation and a correlation threshold.

Figure 10:
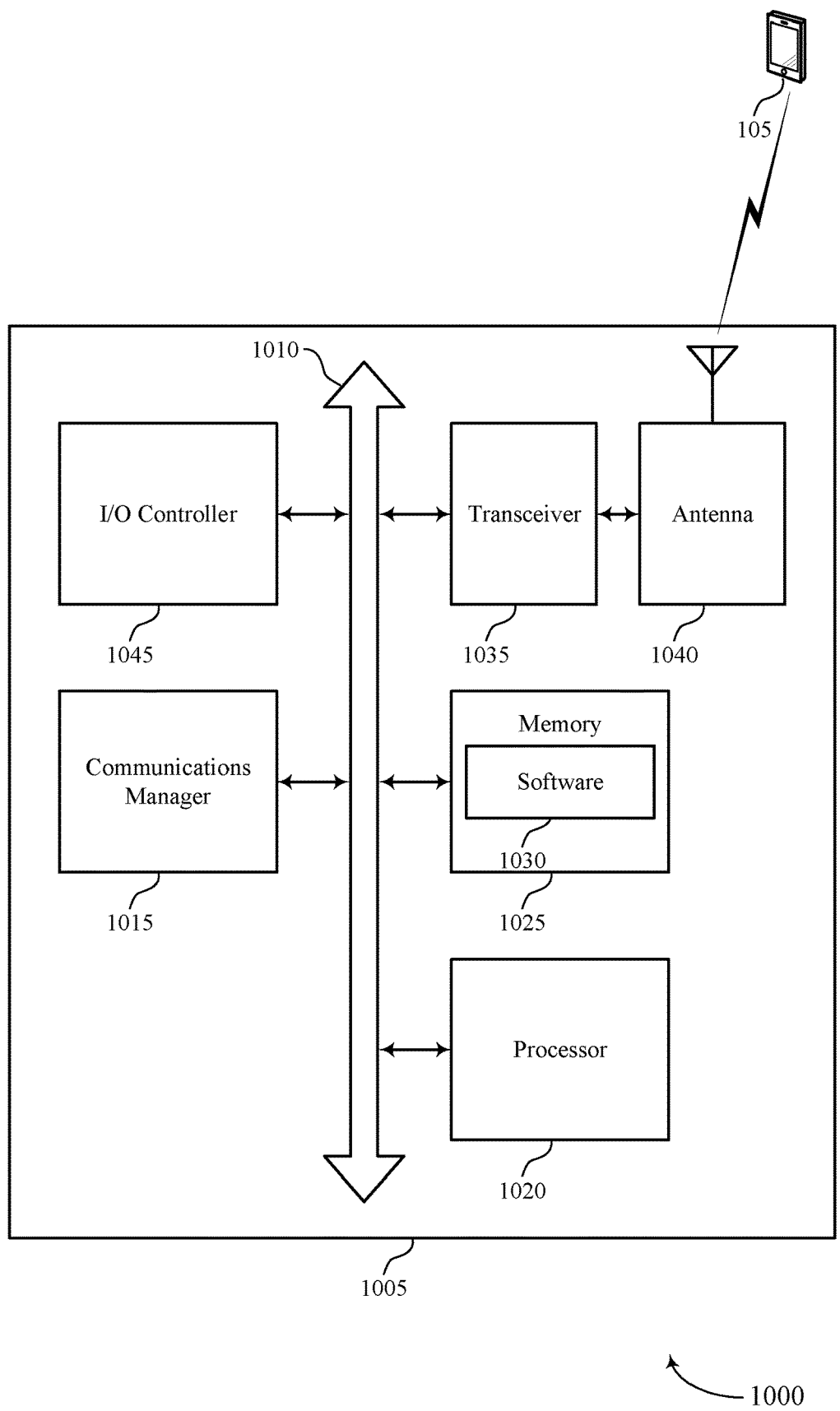
FIG. 10 illustrates a block diagram of a system including an AP that supports inter-operator coordination for channel access in shared spectrum in accordance with various aspects of the present disclosure.

FIG. 10 shows a diagram of a system 1000 including a device 1005 that supports inter-operator coordination for channel access in shared spectrum in accordance with various aspects of the present disclosure. The device 1005 may be an example of or include the components of a wireless device 705, a wireless device 805, or an AP 105 as described above, e.g., with reference to FIGS. 7 and 8. The device 1005 may include components for bi-directional voice and data communications including components for transmitting and receiving communications, including a communications manager 1015, a processor 1020, a memory 1025, a software 1030, a transceiver 1035, an antenna 1040, and an I/O controller 1045. These components may be in electronic communication via one or more buses (e.g., bus 1010).

The processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1020 may be configured to operate a memory array using a memory controller. In other cases, a memory controller may be integrated into the processor 1020. The processor 1020 may be configured to execute computer-readable instructions stored in a memory to perform various functions (e.g., functions or tasks supporting inter-operator coordination for channel access in shared spectrum).

The memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The software 1030 may include code to implement aspects of the present disclosure, including code to support inter-operator coordination for channel access in shared spectrum. The software 1030 may be stored in a non-transitory computer-readable medium such as system memory or other memory. In some cases, the software 1030 may not be directly executable by the processor but may cause a computer (e.g., when compiled and executed) to perform functions described herein.

The transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

The I/O controller 1045 may manage input and output signals for device 1005. The I/O controller 1045 may also manage peripherals not integrated into the device 1005. In some cases, the I/O controller 1045 may represent a physical connection or port to an external peripheral. In some cases, the I/O controller 1045 may utilize an operating system such as iOS®, ANDROID®, MS-DOS®, MS-WINDOWS®, OS/2®, UNIX®, LINUX®, or another known operating system. In other cases, the I/O controller 1045 may represent or interact with a modem, a keyboard, a mouse, a touchscreen, or a similar device. In some cases, the I/O controller 1045 may be implemented as part of a processor. In some cases, a user may interact with the device 1005 via the I/O controller 1045 or via hardware components controlled by the I/O controller 1045.

Figure 11:
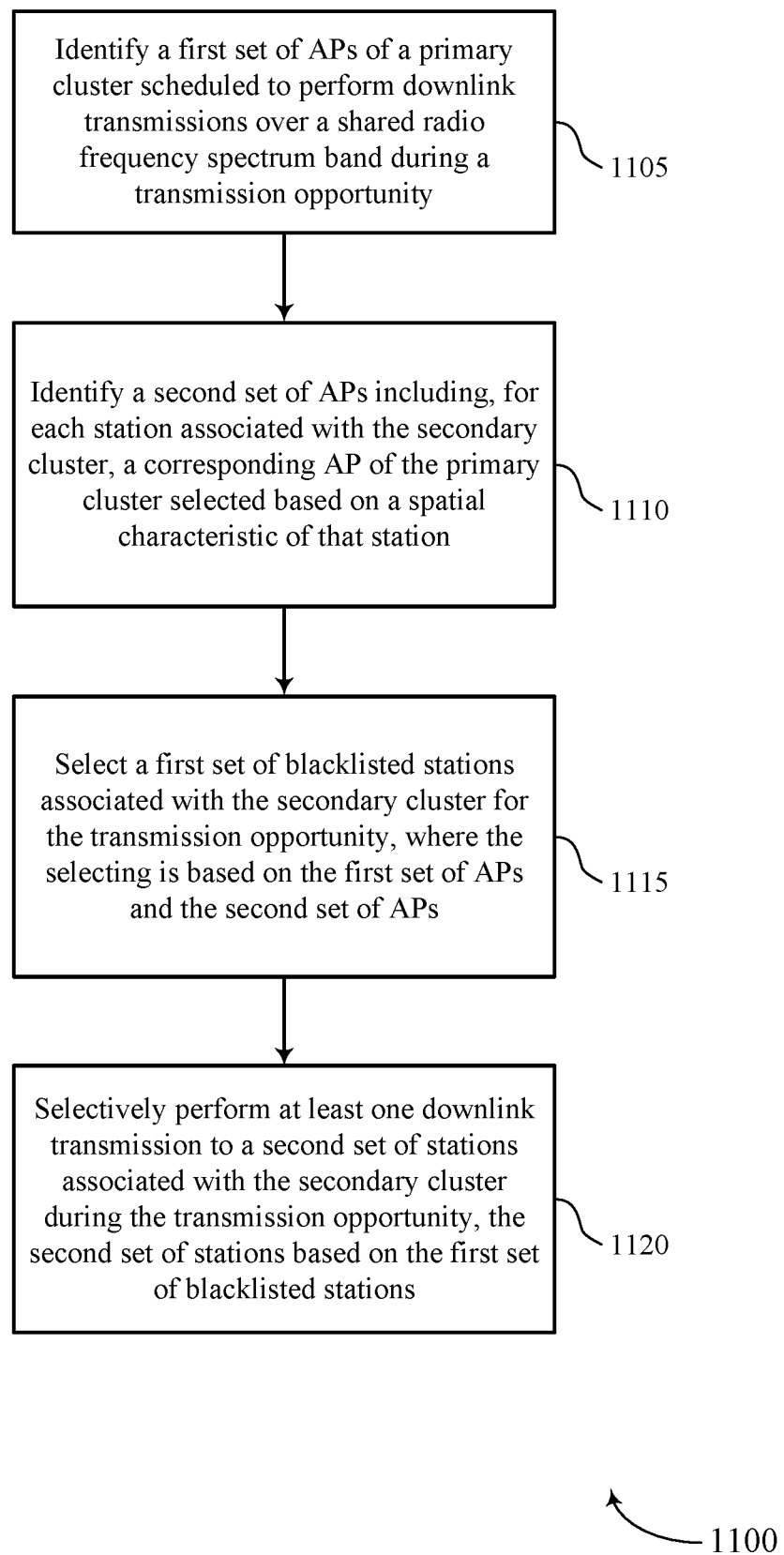
FIGS. 11 through 12 illustrate methods for inter-operator coordination for channel access in shared spectrum in accordance with various aspects of the present disclosure.

FIG. 11 shows a flowchart illustrating a method 1100 for inter-operator coordination for channel access in shared spectrum in accordance with various aspects of the present disclosure. The operations of method 1100 may be implemented by an AP 105 or its components as described herein. In some examples, the AP 105 may belong to a secondary cluster. For example, the operations of method 1100 may be performed by a communications manager as described with reference to FIGS. 7 through 10. In some examples, an AP 105 may execute a set of codes to control the functional elements of the device to perform the functions described below. Additionally, or alternatively, the AP 105 may perform aspects of the functions described below using special-purpose hardware.

At 1105 the AP 105 may identify a first set of APs of a primary cluster scheduled to perform downlink transmissions over a shared radio frequency spectrum band during a transmission opportunity. The operations of 1105 may be performed according to the methods described herein. In certain examples, aspects of the operations of 1105 may be performed by an AP identification component as described with reference to FIGS. 7 through 10.

At 1110 the AP 105 may identify a second set of APs comprising, for each station associated with the secondary cluster, a corresponding AP of the primary cluster selected based on a spatial characteristic or parameter of that station. The operations of 1110 may be performed according to the methods described herein. In certain examples, aspects of the operations of 1110 may be performed by an AP identification component as described with reference to FIGS. 7 through 10.

At 1115 the AP 105 may select a first set of blacklisted stations associated with the secondary cluster for the transmission opportunity. In some cases, the selecting is based on the first set of APs and the second set of APs. The operations of 1115 may be performed according to the methods described herein. In certain examples, aspects of the operations of 1115 may be performed by a station selection component as described with reference to FIGS. 7 through 10.

At 1120 the AP 105 may selectively perform at least one downlink transmission to a second set of stations associated with the secondary cluster during the transmission opportunity. In some cases, the second set of stations is based on the first set of blacklisted stations. In some cases, the downlink transmission is performed using a spatial division multiplexing technique between the primary cluster and the secondary cluster. The operations of 1120 may be performed according to the methods described herein. In certain examples, aspects of the operations of 1120 may be performed by a transmitter as described with reference to FIGS. 7 through 10.

Figure 12:
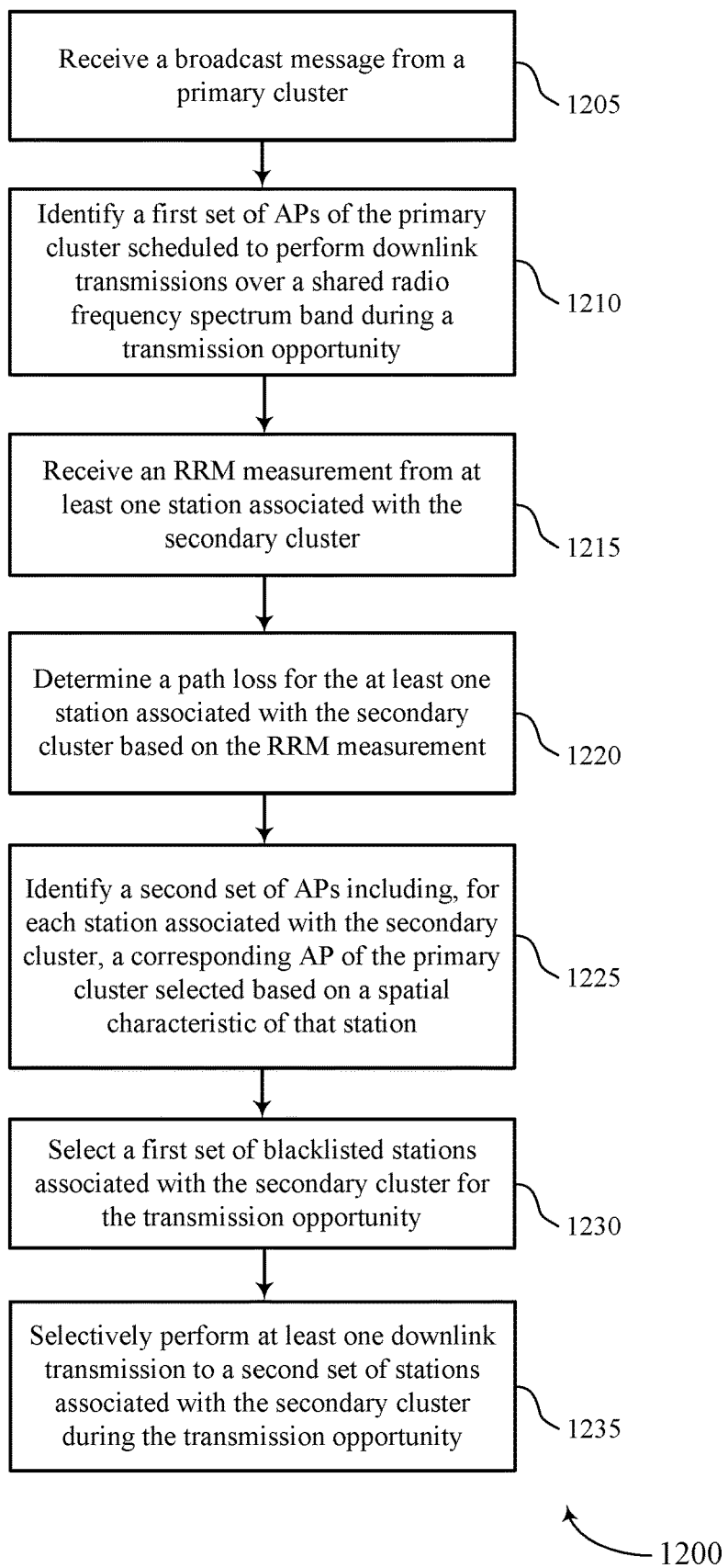

FIG. 12 shows a flowchart illustrating a method 1200 for inter-operator coordination for channel access in shared spectrum in accordance with various aspects of the present disclosure. The operations of method 1200 may be implemented by an AP 105 or its components as described herein. For example, the operations of method 1200 may be performed by a communications manager as described with reference to FIGS. 7 through 10. In some examples, an AP 105 may execute a set of codes to control the functional elements of the device to perform the functions described below. Additionally or alternatively, the AP 105 may perform aspects of the functions described below using special-purpose hardware.

At 1205 the AP 105 may receive a broadcast message from a primary cluster. In some cases, the AP 105 may belong to a secondary cluster. In some cases, the broadcast message may include an identification of each AP included in the first set of APs. The operations of 1205 may be performed according to the methods described herein. In certain examples, aspects of the operations of 1205 may be performed by a receiver as described with reference to FIGS. 7 through 10.

At 1210 the AP 105 may identify a first set of APs of the primary cluster scheduled to perform downlink transmissions over a shared radio frequency spectrum band during a transmission opportunity. The operations of 1210 may be performed according to the methods described herein. In certain examples, aspects of the operations of 1210 may be performed by an AP identification component as described with reference to FIGS. 7 through 10.

At 1215 the AP 105 may receive an RRM measurement from at least one station associated with the secondary cluster. The operations of 1215 may be performed according to the methods described herein. In certain examples, aspects of the operations of 1215 may be performed by an RRM receiver as described with reference to FIGS. 7 through 10.

At 1220 the AP 105 may determine a path loss for the at least one station associated with the secondary cluster based on the RRM measurement. In some cases, the AP 105 may determine a second set of APs based on the determined path loss. The operations of 1220 may be performed according to the methods described herein. In certain examples, aspects of the operations of 1220 may be performed by a path loss component as described with reference to FIGS. 7 through 10.

At 1225 the AP 105 may identify a second set of APs comprising, for each station associated with the secondary cluster, a corresponding AP of the primary cluster selected based on a spatial characteristic or parameter of that station. The operations of 1225 may be performed according to the methods described herein. In certain examples, aspects of the operations of 1225 may be performed by an AP identification component as described with reference to FIGS. 7 through 10.

At 1230 the AP 105 may select a first set of blacklisted stations associated with the secondary cluster for the transmission opportunity. In some cases, the selecting is based on the first set of APs and the second set of APs. The operations of 1230 may be performed according to the methods described herein. In certain examples, aspects of the operations of 1230 may be performed by a station selection component as described with reference to FIGS. 7 through 10.

At 1235 the AP 105 may selectively perform at least one downlink transmission to a second set of stations associated with the secondary cluster during the transmission opportunity. In some implementations, the second set of stations is based on the first set of blacklisted stations. In some cases, the downlink transmission is performed using spatial division multiplexing between the primary cluster and the secondary cluster. The operations of 1235 may be performed according to the methods described herein. In certain examples, aspects of the operations of 1235 may be performed by a transmitter as described with reference to FIGS. 7 through 10.

It should be noted that the methods described above describe possible implementations, and that the operations and the steps may be rearranged or otherwise modified, making other implementations possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by stations 115 with service subscriptions with the network provider. A small cell may be associated with a lower-powered base station or AP, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by stations 115 with service subscriptions with the network provider. A femto cell may also cover a small geographic area (e.g., a home) and may provide restricted access by stations 115 having an association with the femto cell (e.g., stations 115 in a closed subscriber group (CSG), stations 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the APs 105 may have similar frame timing, and transmissions from different APs 105 may be approximately aligned in time. For asynchronous operation, the APs 105 may have different frame timing, and transmissions from different APs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by an access point of a secondary cluster, comprising:
   identifying a first set of access points of a primary cluster scheduled to perform downlink transmissions over a shared radio frequency spectrum band during a transmission opportunity;
   identifying a second set of access points comprising, for each station associated with the secondary cluster, a corresponding access point of the primary cluster selected based at least in part on a pathloss value associated with that station;
   selecting a first set of restricted stations associated with the secondary cluster for the transmission opportunity, wherein the selecting is based at least in part on the first set of access points and the second set of access points; and
   selectively performing at least one downlink transmission to a second set of stations associated with the secondary cluster during the transmission opportunity, the second set of stations based at least in part on the first set of restricted stations, the at least one downlink transmission using spatial division multiplexing between the primary cluster and the secondary cluster.

2. The method of claim 1, wherein identifying the first set of access points of the primary cluster comprises:
   receiving a broadcast message from the primary cluster for the transmission opportunity, the broadcast message comprising an identification of each access point included in the first set of access points.

3. The method of claim 1, wherein identifying the second set of access points comprises:
   determining, for each station associated with the secondary cluster, a path loss to the corresponding access point of the primary cluster; wherein the pathloss value associated with that station comprises the determined path loss.

4. The method of claim 3, wherein determining, for each station associated with the secondary cluster, the path loss to the corresponding access point of the primary cluster further comprises:
   receiving a radio resource management (RRM) measurement from at least one station associated with the secondary cluster; and
   determining the path loss for the at least one station associated with the secondary cluster based at least in part on the RRM measurement.

5. The method of claim 1, further comprising:
   receiving a pathloss value associated with each access point included in the first set of access points; and
   determining the pathloss value for each station associated with the secondary cluster based at least in part on a path loss between that station and each access point of the primary cluster.

6. The method of claim 5, further comprising:
   determining, for each station associated with the secondary cluster, a correlation between the pathloss value for that station and the pathloss value associated with each access point of the first set of access points; and wherein selecting the first set of restricted stations associated with the secondary cluster for the transmission opportunity is based at least in part on the determined correlation and a correlation threshold.

7. The method of claim 1, wherein identifying the first set of access points of the primary cluster comprises:

receiving the pathloss value for each station included in a set of stations associated with the primary cluster.

8. The method of claim 7, further comprising:

determining, for each station associated with the secondary cluster, a correlation between the pathloss value for that station and the pathloss value for each station included in the set of stations associated with the primary cluster; and wherein selecting the first set of restricted stations associated with the secondary cluster for the transmission opportunity is based at least in part on the determined correlation and a correlation threshold.

9. The method of claim 1, further comprising:

receiving from the primary cluster an identification of at least one access point associated with the secondary cluster, wherein selecting the first set of restricted stations associated with the secondary cluster for the transmission opportunity is based at least in part on the received identification.

10. An apparatus for wireless communications by an access point of a secondary cluster, comprising:

means for identifying a first set of access points of a primary cluster scheduled to perform downlink transmissions over a shared radio frequency spectrum band during a transmission opportunity;

means for identifying a second set of access points comprising, for each station associated with the secondary cluster, a corresponding access point of the primary cluster selected based at least in part on a pathloss value associated with that station;

means for selecting a first set of restricted stations associated with the secondary cluster for the transmission opportunity, wherein the selecting is based at least in part on the first set of access points and the second set of access points; and means for selectively performing at least one downlink transmission to a second set of stations associated with the secondary cluster during the transmission opportunity, the second set of stations based at least in part on the first set of restricted stations, the at least one downlink transmission using spatial division multiplexing between the primary cluster and the secondary cluster.

11. The apparatus of claim 10, wherein the means for identifying the first set of access points of the primary cluster further comprising:

means for receiving a broadcast message from the primary cluster for the transmission opportunity, the broadcast message comprising an identification of each access point included in the first set of access points.

12. The apparatus of claim 10, wherein the means for identifying the second set of access points further comprising:

means for determining, for each station associated with the secondary cluster, a path loss to the corresponding access point of the primary cluster; wherein the pathloss value associated with that station comprises the determined path loss.

13. The apparatus of claim 12, wherein the means for determining, for each station associated with the secondary cluster, the path loss to the corresponding access point of the primary cluster further comprising:

means for receiving a radio resource management (RRM) measurement from at least one station associated with the secondary cluster; and means for determining the path loss for the at least one station associated with the secondary cluster based at least in part on the RRM measurement.

14. The apparatus of claim 10, further comprising:

means for receiving a pathloss value associated with each access point included in the first set of access points; and means for determining the pathloss value for each station associated with the secondary cluster based at least in part on a path loss between that station and each access point of the primary cluster.

15. The apparatus of claim 14, further comprising:

means for determining, for each station associated with the secondary cluster, a correlation between the pathloss value for that station and the pathloss value associated with each access point of the first set of access points; and wherein the means for selecting the first set of restricted stations associated with the secondary cluster for the transmission opportunity is based at least in part on the determined correlation and a correlation threshold.

16. The apparatus of claim 10, further comprising:

means for receiving the pathloss value for each station included in a set of stations associated with the primary cluster.

17. The apparatus of claim 16, wherein the means for identifying the first set of access points of the primary cluster further comprising:

means for determining, for each station associated with the secondary cluster, a correlation between the pathloss value for that station and the pathloss value for each station included in the set of stations associated with the primary cluster; and wherein the means for selecting the first set of restricted stations associated with the secondary cluster for the transmission opportunity is based at least in part on the determined correlation and a correlation threshold.

18. The apparatus of claim 10, further comprising:

means for receiving from the primary cluster an identification of at least one access point associated with the secondary cluster wherein the means for selecting the first set of restricted stations associated with the secondary cluster for the transmission opportunity is based at least in part on the received identification.

19. An apparatus for wireless communications by an access point of a secondary cluster, comprising:

a processor;

memory in electronic communication with the processor; and instructions stored in the memory, wherein the instructions are executable by the processor to:

identify a first set of access points of a primary cluster scheduled to perform downlink transmissions over a shared radio frequency spectrum band during a transmission opportunity;

identify a second set of access points comprising, for each station associated with the secondary cluster, a corresponding access point of the primary cluster selected based at least in part on a pathloss value associated with that station;

select a first set of restricted stations associated with the secondary cluster for the transmission opportunity, wherein the selecting is based at least in part on the first set of access points and the second set of access points; and selectively perform at least one downlink transmission to a second set of stations associated with the secondary cluster during the transmission opportunity, the second set of stations based at least in part on the first set of restricted stations, the at least one downlink transmission using spatial division multiplexing between the primary cluster and the secondary cluster.

20. The apparatus of claim 19, wherein the instructions executable by the processor to identify the first set of access points of the primary cluster comprise instructions executable by the processor to:

receive a broadcast message from the primary cluster for the transmission opportunity, the broadcast message comprising an identification of each access point included in the first set of access points.

21. The apparatus of claim 19, wherein the instructions executable by the processor to identify the second set of access points comprise instructions executable by the processor to:

determine, for each station associated with the secondary cluster, a path loss to the corresponding access point of the primary cluster; wherein the pathloss value associated with that station comprises the determined path loss.

22. The apparatus of claim 21, wherein the instructions executable by the processor to determine, for each station associated with the secondary cluster, the path loss to the corresponding access point of the primary cluster comprise instructions executable by the processor to:

receive a radio resource management (RRM) measurement from at least one station associated with the secondary cluster; and determine the path loss for the at least one station associated with the secondary cluster based at least in part on the RRM measurement.

23. The apparatus of claim 19, wherein the instructions are further executable by the processor to cause the apparatus to:

receive a pathloss value associated with each access point included in the first set of access points; and determine the pathloss value for each station associated with the secondary cluster based at least in part on a path loss between that station and each access point of the primary cluster.

24. The apparatus of claim 23, wherein the instructions are further executable by the processor to cause the apparatus to:

determine, for each station associated with the secondary cluster, a correlation between the pathloss value of that station and the pathloss value associated with each access point of the first set of access points; and wherein selecting the first set of restricted stations associated with the secondary cluster for the transmission opportunity is based at least in part on the determined correlation and a correlation threshold.

25. The apparatus of claim 19, wherein the instructions executable by the processor to identify the first set of access points of the primary cluster comprise instructions executable by the processor to:

receive the pathloss value for each station included in a set of stations associated with the primary cluster.

26. The apparatus of claim 25, wherein the instructions are further executable by the processor to cause the apparatus to:

determine, for each station associated with the secondary cluster, a correlation between the pathloss value for that station and the pathloss value for each station included in the set of stations associated with the primary cluster; and wherein selecting the first set of restricted stations associated with the secondary cluster for the transmission opportunity is based at least in part on the determined correlation and a correlation threshold.

27. The apparatus of claim 19, wherein the instructions are further executable by the processor to cause the apparatus to:

receive from the primary cluster an identification of at least one access point associated with the secondary cluster, wherein selecting the first set of restricted stations associated with the secondary cluster for the transmission opportunity is based at least in part on the received identification.

28. A non-transitory computer-readable medium storing code for wireless communication by an access point of a secondary cluster, the code comprising instructions executable by a processor to:

identify a first set of access points of a primary cluster scheduled to perform downlink transmissions over a shared radio frequency spectrum band during a transmission opportunity;

identify a second set of access points comprising, for each station associated with the secondary cluster, a corresponding access point of the primary cluster selected based at least in part on a pathloss value associated with that station;

select a first set of restricted stations associated with the secondary cluster for the transmission opportunity, wherein the selecting is based at least in part on the first set of access points and the second set of access points; and selectively perform at least one downlink transmission to a second set of stations associated with the secondary cluster during the transmission opportunity, the second set of stations based at least in part on the first set of restricted stations, the at least one downlink transmission using spatial division multiplexing between the primary cluster and the secondary cluster.

29. The non-transitory computer-readable medium of claim 28, wherein the instructions are further executable by the processor to:

receive a broadcast message from the primary cluster for the transmission opportunity, the broadcast message comprising an identification of each access point included in the first set of access points.

30. The non-transitory computer-readable medium of claim 28, wherein the instructions are further executable by the processor to:

determine, for each station associated with the secondary cluster, a path loss to the corresponding access point of the primary cluster; wherein the pathloss value associated with that station comprises the determined path loss.

* * * * *